(12) United States Patent
Epshteyn

(10) Patent No.: US 7,574,859 B2
(45) Date of Patent: Aug. 18, 2009

(54) MONOCYLINDRICAL HYBRID TWO-CYCLE ENGINE, COMPRESSOR AND PUMP, AND METHOD OF OPERATION

(76) Inventor: Grigoriy Epshteyn, 804 Rossville Ave., Staten Island, NY (US) 10309

( * ) Notice: Subject to any disclaimer, the term of this patent is extended or adjusted under 35 U.S.C. 154(b) by 623 days.

(21) Appl. No.: 11/373,793

(22) Filed: Mar. 10, 2006

(65) Prior Publication Data

US 2007/0209615 A1    Sep. 13, 2007

(51) Int. Cl.
F16D 31/02 (2006.01)
F01B 13/04 (2006.01)
(52) U.S. Cl. .......................... 60/413; 91/505
(58) Field of Classification Search ................. 60/413; 91/504, 505; 417/53, 222.1, 269, 364; 123/56.3, 123/66, 68, 71 R
See application file for complete search history.

(56) References Cited

U.S. PATENT DOCUMENTS

| | | | | |
|---|---|---|---|---|
| 4,992,031 A * | 2/1991 | Sampo | ....................... | 417/364 |
| 5,036,667 A | 8/1991 | Thatcher | ....................... | 60/595 |
| 5,167,292 A | 12/1992 | Moiroux et al. | ............. | 180/165 |
| 5,261,797 A | 11/1993 | Christenson | ................. | 417/380 |
| 5,556,262 A | 9/1996 | Achten et al. | ................ | 417/364 |
| 5,616,010 A | 4/1997 | Sawyer | ....................... | 417/364 |
| 6,293,231 B1 | 9/2001 | Valentin | ..................... | 123/46 R |
| 7,011,051 B2 * | 3/2006 | Epshteyn | ..................... | 417/364 |
| 7,373,870 B2 * | 5/2008 | Epshteyn | ..................... | 91/506 |

OTHER PUBLICATIONS

U.S. Appl. No. 10/638,024 "Hybrid two cycle engine, compressor and pump, and method of operation", filed Aug. 8, 2003, inventor—Epshteyn, Grigoriy.
U.S. Appl. No. 11/110,109 "Universal hybrid engine, compressor and pump, and method of operation", filed Apr. 20, 2005, inventor—Epshteyn, Grigoriy.

* cited by examiner

Primary Examiner—Michael Leslie

(57) ABSTRACT

The monocilindrical hybrid comprises a boosted by the reciprocating air compressor two-cycle engine and a hydraulic pump. The pump plunger fastened to engine piston and located coaxially with the compressor piston and pump rotor comprised stabilizer hydraulic motor and two diametrically opposite axial rods associated with the plunger, compressor piston and swash plate. The swash plate turn changes the engine piston stroke and remains the engine compression ratio. The swash plate shift changes the engine compression ratio for the either kind of fuel use. The hybrid and pneumo-hydraulic accumulator association transforms the single pump plunger supply pulsation into uniform fluid flow feeding the hydrostatic transmission motor. Direct energy transmission, variable engine, compressor and pump displacement volume and energy recuperation increases the specific power, decreases the weight and installation space and enables to achieve 80 mile per gallon for the car in city conditions.

15 Claims, 16 Drawing Sheets

4 — 4

5 — 5

MONOCYLINDRICAL HYBRID TWO-CYCLE ENGINE, COMPRESSOR AND PUMP, AND METHOD OF OPERATION

CROSS-REFERENCE TO RELATED APPLICATIONS

Not Applicable

FEDERALLY SPONSORED RESEARCH

Not Applicable

SEQUENCE OF THE INVENTION

Not Applicable

BACKGROUND OF THE INVENTION

1. Field of Invention

This invention relates to hydrostatic transmission, specifically to a system of internal combustion engine and pump, which are used for high pressurized fluid flow generation of such transmission.

2. Background of the Invention

The widespread engine and pump system with hydrostatic transmission is used to drive wheels and working equipment of widely known machinery mountainous, construction, agricultural, transportation automotive and other heavy equipment.

System engine-pump are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,036,667 to Thatcher (1991), U.S. Pat. No. 5,167,292 to Moiroux et al. (1992), U.S. Pat. No. 5,261,797 to Christenson (1993), U.S. Pat. No. 5,556,262 to Achten et al. (1996), U.S. Pat. No. 5,616,010 to Sawyer (1997), U.S. Pat. No. 6,293,231 to Valentin (2001), U.S. patent application "The hybrid two cycle engine, compressor and pump and method of operation" Ser. No. 10/638,024 (filing date Aug. 8, 2003) to the same inventor Epshteyn and U.S. patent application "Universal hybrid engine, compressor and pump and method of operation" Ser. No. 11/110,109 (filing date Apr. 20, 2005) to the same inventor Epshteyn.

While these devices fulfill their respective, particular objective and requirements, the aforementioned patents do not describe the monocylidrical hybrid engine, compressor and pump and method of operation for providing increased efficiency and specific power while minimizing the weight, installation space and fuel consumption.

The hybrid two-cycle engine, compressor and pump has the following disadvantages:

(a) The hybrid two-cycle engine, compressor and pump requires for the uniform oil flow generation the multi-cylinder engine design, which considerable increases the weight, installation space and cost.

(b) The engine piston return stroke (upwards motion) provides the other cylinder's piston power stroke by means of the rotors connecting gear. These eliminate autonomy operation of the single cylinder engine and prevent from realize a super compact and inexpensive monocylindrical hybrid.

(c) The engine start provides the pump plunger as a linear hydraulic motor using the pneumohydraulic accumulator energy and requires assistance of the other cylinder's plunger for completed cycle. This prevent from realize a simple and inexpensive monocylindrical hybrid.

(d) The hybrid system not provides the automotive acceleration by means of the pneumohydraulic accumulator stored energy and not realizes the energy recuperation method great potentiality for the fuel consumption decrease.

(e) The hybrid system not accumulates the automotive kinetic energy during the braking for the subsequent automotive acceleration and not realizes the energy regenerative braking method great potentiality for the fuel economy.

(f) The hybrid system not provides the automotive movement by means of the pneumohydraulic accumulator stored energy for emergency occasion if dead engine.

(g) The hybrid system not provides use of the progressive hydrostatic transmission with monocylindrical hybrid engine, compressor, pump and hydrostatic motor instead of the widespread automotive multicylinder engine with automatic transmission.

BACKGROUND OF THE INVENTION-OBJECTS AND ADVANTAGES

Therefore, it can be appreciated that there exists a continuing need for a new and improved monocylindrical hybrid engine, compressor and pump for progressive hydrostatic transmission having better specific data than widespread automotive engine and automatic transmission.

The present invention substantially fulfills these needs.

The objectives and advantages of the present invention are:

(a) to provide the monocylindrical hybrid two-cycle engine, compressor and pump uniform oil flow generation by means of the pump association with the pneumohydraulic accumulator, hydrostatic motor and stabilizer hydraulic motor;

(b) to provide the monocylindrical hybrid two-cycle engine piston return stroke by means of association pump with the pneumohydraulic accumulator and hydrostatic converter;

(c) to provide the monocylindrical hybrid engine start by means of the stabilizer hydraulic motor associated with the pneumohydraulic accumulator and jointly operated with the pump plunger in capacity of an engine starter;

(d) to provide the automotive acceleration by means of the pneumohydraulic accumulator energy activated the hydrostatic motor independent of the engine operation mode;

(e) to provide the automotive regenerative braking by means of the hydrostatic motor in the pump mode charges the pneumohydraulic accumulator independent of the engine operation mode;

(f) to provide the automotive movement even if dead engine by means of the hydrostatic motor and the pneumohydraulic accumulator association;

(g) to provide use of the progressive hydrostatic transmission with monocylindrical hybrid engine, compressor, pump and hydrostatic motor instead of the widespread multi-cylinder engine and automatic transmission, thereby minimizing the weight, installation space, cost, labor and fuel consumption.

Even more objectives and advantages will become apparent from a consideration of the ensuing description and drawings.

SUMMARY OF THE INVENTION

In accordance with the present invention the monocylindrical hybrid engine, compressor and pump, (which we shall refer to simply as "hybrid") is comprised a two-cycle engine, compressor, pump with rotor, synchronize mechanism with a pivotable swash plate, swash plate turn mechanism and the distance change mechanism between rotor centerline and the swash plate hinge pin axis (which we shall refer to simply as "swash plate shift mechanism"), conic reducer, swash plate turn hydraulic system, swash plate shift hydraulic system, hydraulic control system associated with at least one conventional hydrostatic motor and conventional accessory units.

The engine is comprised of a cylinder with cooling system, piston with rings, cylinder head with combustion chamber, camshaft, air injection valve, exhaust valve and exhaust manifold. The engine piston located between the compressor chamber and combustion chamber.

The compressor is comprised of a piston with rings and the compressor chamber located within the engine cylinder between the engine and compressor pistons. The compressor piston fastened to a hub. The compressor is comprised of an intake manifold, intake and output valves with springs, which are located on the side surface of engine cylinder. The output valve is coupled with the air injection valve of the engine by a receiver, which is comprised of a water jacket and is located on the side surface of engine cylinder. The compressor intake valve is connected with the one lobe by means of rod and pivotably mounted rocker. The compressor output valve is connected with the second lobe by rod and both lobes fastened to pump's rotor.

The pump housing is the engine cylinder and joined to a valve plate. A pump's rotor is comprised of a cylinder block fastened to an abutment, a plunger fastened to the engine piston. The plunger, rotor, compressor piston and hub located coaxially. The rotor is coupled with the pump housing by a bearing with a disc spring. The valve plate is comprised a pump inlet and outlet slots, forming the circumference, coupled with the pump chamber by the rotor canal. The valve plate also comprised circular slot and autonomous slots, forming the circumference. The autonomous slots association with a rotor's pistons formed stabilizer hydraulic motor connected in series with said pump and at least one hydrostatic transmission motor. Within the valve plate mounted a bearings and centring shaft connected to the rotor by toothed clutch.

The synchronize mechanism is comprised two diametrically opposite axial rods of the rotor, yoke, compensate pistons, lever, pin shoe and saddle shoe. The yoke coupled with rotor by floating support and booster's pistons. Axial rods coupled with compensate pistons inside of the rotor and coupled with the swash plate by shoes outside of the rotor. The first axial rod pivotably coupled with the plunger by the pin shoe and lever. The lever pivotably coupled with the rotor by sliders and axle, pivotably coupled with a crossbar by sliders and pivotably coupled with the yoke by pin shoe. The second axial rod pivotably coupled with compressor piston's hub and yoke by a saddle shoe and sliding holder inside of the rotor. The sliding holder connected to the rotor by means of ledges mounted within rotor's guide grooves. The yoke pivotably coupled with floating support. The floating support coupled with rotor by booster's pistons and connected to the rotor by means of ledges mounted within rotor's guide grooves.

The conic reducer's first gearwheel is fastened to the rotor and the second conic gearwheel mounted on one shaft with a first sprocket wheel associated by means of chain with a second sprocket wheel fastened to said engine camshaft, which on opposite side of the engine comprises a pulley associated with an accessory units by means of the belt. The second conic gearwheel, shaft with bearings, first sprocket wheel and housing formed modular assembly fastened to the engine cylinder. The accessory regular units (not illustrated)—cooling system pump, electric system generator, steering pump, associated with the belt.

The swash plate associated with the pump's valve plate by swash plate turn mechanism and swash plate shift mechanism.

The swash plate turn mechanism is comprised servo cylinder with piston. The swash plate pin pivotably coupled with servo cylinder piston by rod. The servo cylinder fastened to the valve plate.

The swash plate shift mechanism is comprised of a servo cylinder with piston and lever. The swash plate pivotably coupled with servo cylinder piston by lever, rod and hinge pin. The servo cylinder fastened to the valve plate and the lever pivotably coupled with the engine cylinder.

The swash plate turn hydraulic system is comprised of a hydraulic distributor with solenoids. A first and second lines of the distributor is connected with the servo cylinder, third line is coupled with the tank and the fourth line of the distributor is coupled with pneumohydraulic accumulator.

The swash plate shift hydraulic system comprised of a hydraulic distributor with solenoids. A first and second lines of the distributor is connected with the servo cylinder, third line is coupled with the pneumohydraulic accumulator and the fourth line of the distributor is coupled with the tank.

The hydraulic control system of hybrid is comprised of a first and second hydraulic distributors with solenoids. The first line of the first distributor is connected with the stabilizer motor outlet and with the hydrostatic converter outlet; the second line is coupled with a pump outlet and check valve inlet; the third line is coupled with the pneumohydraulic accumulator, the fourth line is coupled with pump inlet and second check valve inlet and the fifth line is coupled with the tank.

A first and second lines of the second hydraulic distributor with solenoids coupled respectively with inlet and outlet of hydrostatic motor, represented in (FIG. 16) by an encircled "M" also the first line coupled with check valve outlet; the third line is coupled with the tank and the fourth line of the second distributor is coupled with the pneumohydraulic accumulator.

The pneumohydraulic accumulator coupled with the hydrostatic converter inlet, coupled with the circular slot of the valve plate and coupled with starter pump, which comprises of a pedal. The hydrostatic converter comprises inlet chamber, drain chamber, outlet chamber and two different diameter pistons. The line coupled hydrostatic motor outlet with the stabilizer motor inlet goes via regenerative braking valve comprised piston, spring and control chamber associated with automotive conventional break system (not illustrated) by control line.

There has thus been outlined, rather broadly, some features of the invention in order that the detailed description thereof that follows may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description illustrated in the drawings.

The invention is capable of other embodiments and of being practiced and carried out in various ways. Also, it is to be understood that the phraseology and terminology employed herein are for the purpose of description and should not be regarded is limiting.

As such, those skilled in the art will appreciate that the conception, upon which this disclosure is based, may readily be utilized as a basis for the designing of other structures, methods and system for carrying out the several purposes of the present invention. It is important, therefore, that the claims be regarded as including such equivalent constructions insofar as they do not depart from the spirit and scope of the present invention.

It is therefore an object of the present invention to provide a new and improved hybrid, which has all the advantages of the prior art systems engine-pump and none of the disadvantages.

It is another object of the present invention to provide a new and improved single cylinder hybrid two-cycle engine, compressor and pump generating uniform oil flow.

It is an object of the present invention to provide the single engine cylinder autonomous operation thereby the hybrid weight, installation space and cost to decrease.

It is a further object of the present invention to provide monocylindrical engine start by means of the pneumohydraulic accumulator energy activating simultaneously of the stabilizer hydraulic motor and the pump plunger with the engine piston upwards motion.

An even further object of the present invention to provide use of the smaller engine and simultaneously to maintain the automotive acceleration and speed by means of the pneumohydraulic accumulator energy and smaller capacity engine jointly activating the automotive start acceleration and thereby considerable decreasing the fuel consumption.

Even still another object of the present invention is to provide automotive regenerative braking by means of the hydrostatic transmission motor charging the pneumohydraulic accumulator independent of the engine mode operation and thereby considerable decreasing thermal emission and increasing the automotive brake life.

Lastly it is an object of the present invention to provide use of the progressive hydrostatic transmission with monocylindrical hybrid engine, compressor, pump and hydraulic motor instead of the widespread automotive multi-cylinder engine and automatic transmission, thereby minimizing the weight, installation space, cost, labor and fuel consumption necessary in particular for an automobile.

In accordance with the present invention the monocylindrical hybrid engine, compressor and pump, (which we shall refer to simply as "hybrid") is comprised a two-cycle engine, compressor, pump with rotor, synchronize mechanism with a pivotable swash plate, swash plate turn mechanism and the distance change mechanism between rotor centerline and the swash plate hinge pin axis (which we shall refer to simply as "swash plate shift mechanism"), conic reducer, swash plate turn hydraulic system, swash plate shift hydraulic system, hydraulic control system associated with at least one conventional hydrostatic motor and conventional accessory units.

The engine is comprised of a cylinder with cooling system, piston with rings, cylinder head with combustion chamber, camshaft, air injection valve, exhaust valve and exhaust manifold. The engine piston located between the compressor chamber and combustion chamber.

The compressor is comprised of a piston with rings and the compressor chamber located within the engine cylinder between the engine and compressor pistons. The compressor piston fastened to a hub. The compressor is comprised of an intake manifold, intake and output valves with springs, which are located on the side surface of engine cylinder. The output valve is coupled with the air injection valve of the engine by a receiver, which is comprised of a water jacket and is located on the side surface of engine cylinder. The compressor intake valve is connected with the one lobe by means of rod and pivotably mounted rocker. The compressor output valve is connected with the second lobe by rod and both lobes fastened to pump's rotor.

The pump housing is the engine cylinder and joined to a valve plate. A pump's rotor is comprised of a cylinder block fastened to an abutment, a plunger fastened to the engine piston. The plunger, rotor, compressor piston and hub located coaxially. The rotor is coupled with the pump housing by a bearing with a disc spring. The valve plate is comprised a pump inlet and outlet slots, forming the circumference, coupled with the pump chamber by the rotor canal. The valve plate also comprised circular slot and autonomous slots, forming the circumferences. The autonomous slots association with a rotor's pistons formed stabilizer hydraulic motor connected in series with said pump and at least one hydrostatic transmission motor. Within the valve plate mounted a bearings and centring shaft connected to the rotor by toothed clutch.

The synchronize mechanism is comprised two diametrically opposite axial rods of the rotor, yoke, compensate pistons, lever, pin shoe and saddle shoe. The yoke coupled with rotor by floating support and booster's pistons. Axial rods coupled with compensate pistons inside of the rotor and coupled with the swash plate by shoes outside of the rotor. The first axial rod pivotably coupled with the plunger by the pin shoe and lever. The lever pivotably coupled with the rotor by sliders and axle, pivotably coupled with a crossbar by sliders and pivotably coupled with the yoke by pin shoe. The second axial rod pivotably coupled with compressor piston's hub and yoke by a saddle shoe and sliding holder inside of the rotor. The sliding holder connected to the rotor by means of ledges mounted within rotor's guide grooves. The yoke pivotably coupled with floating support. The floating support coupled with rotor by booster's pistons and connected to the rotor by means of ledges mounted within rotor's guide grooves.

The conic reducer's first gearwheel is fastened to the rotor and the second conic gearwheel mounted on one shaft with a first sprocket wheel associated by means of chain with a second sprocket wheel fastened to said engine camshaft, which on opposite side of the engine comprises a pulley associated with an accessory units by means of the belt. The second conic gearwheel, shaft with bearings, first sprocket wheel and housing formed modular assembly fastened to the engine cylinder. The accessory regular units (not illustrated)—cooling system pump, electric system generator, steering pump, associated with the belt.

The swash plate associated with the pump's valve plate by swash plate turn mechanism and swash plate shift mechanism.

The swash plate turn mechanism is comprised servo cylinder with piston. The swash plate pin pivotably coupled with servo cylinder piston by rod. The servo cylinder fastened to the valve plate.

The swash plate shift mechanism is comprised of a servo cylinder with piston and lever. The swash plate pivotably coupled with servo cylinder piston by lever, rod and hinge pin. The servo cylinder fastened to the valve plate and the lever pivotably coupled with the engine cylinder.

The swash plate turn hydraulic system is comprised of a hydraulic distributor with solenoids. A first and second lines of the distributor is connected with the servo cylinder, third line is coupled with the tank and the fourth line of the distributor is coupled with pneumohydraulic accumulator.

The swash plate shift hydraulic system comprised of a hydraulic distributor with solenoids. A first and second lines of the distributor is connected with the servo cylinder, third line is coupled with the pneumohydraulic accumulator and the fourth line of the distributor is coupled with the tank.

The hydraulic control system of hybrid is comprised of a first and second hydraulic distributors with solenoids. The first line of the first distributor is connected with the stabilizer motor outlet and with the hydrostatic converter outlet; the second line is coupled with a pump outlet and check valve inlet; the third line is coupled with the pneumohydraulic accumulator, the fourth line is coupled with pump inlet and second check valve inlet and the fifth line is coupled with the tank.

A first and second lines of the second hydraulic distributor with solenoids coupled respectively with inlet and outlet of hydrostatic motor, represented in (FIG. 16) by an encircled "M" also the first line coupled with check valve outlet; the third line is coupled with the tank and the fourth line of the second distributor is coupled with the pneumohydraulic accumulator.

The pneumohydraulic accumulator coupled with the hydrostatic converter inlet, coupled with the circular slot of the valve plate and coupled with starter pump, which comprises of a pedal. The hydrostatic converter comprises inlet chamber, drain chamber, outlet chamber and two different diameter pistons. The line coupled hydrostatic motor outlet with the stabilizer motor inlet goes via regenerative braking valve comprised piston, spring and control chamber associated with automotive conventional break system (not illustrated) by control line.

DRAWINGS-FIGURES

The same reference numerals refer to the same parts through the various figures.

Figure 16:
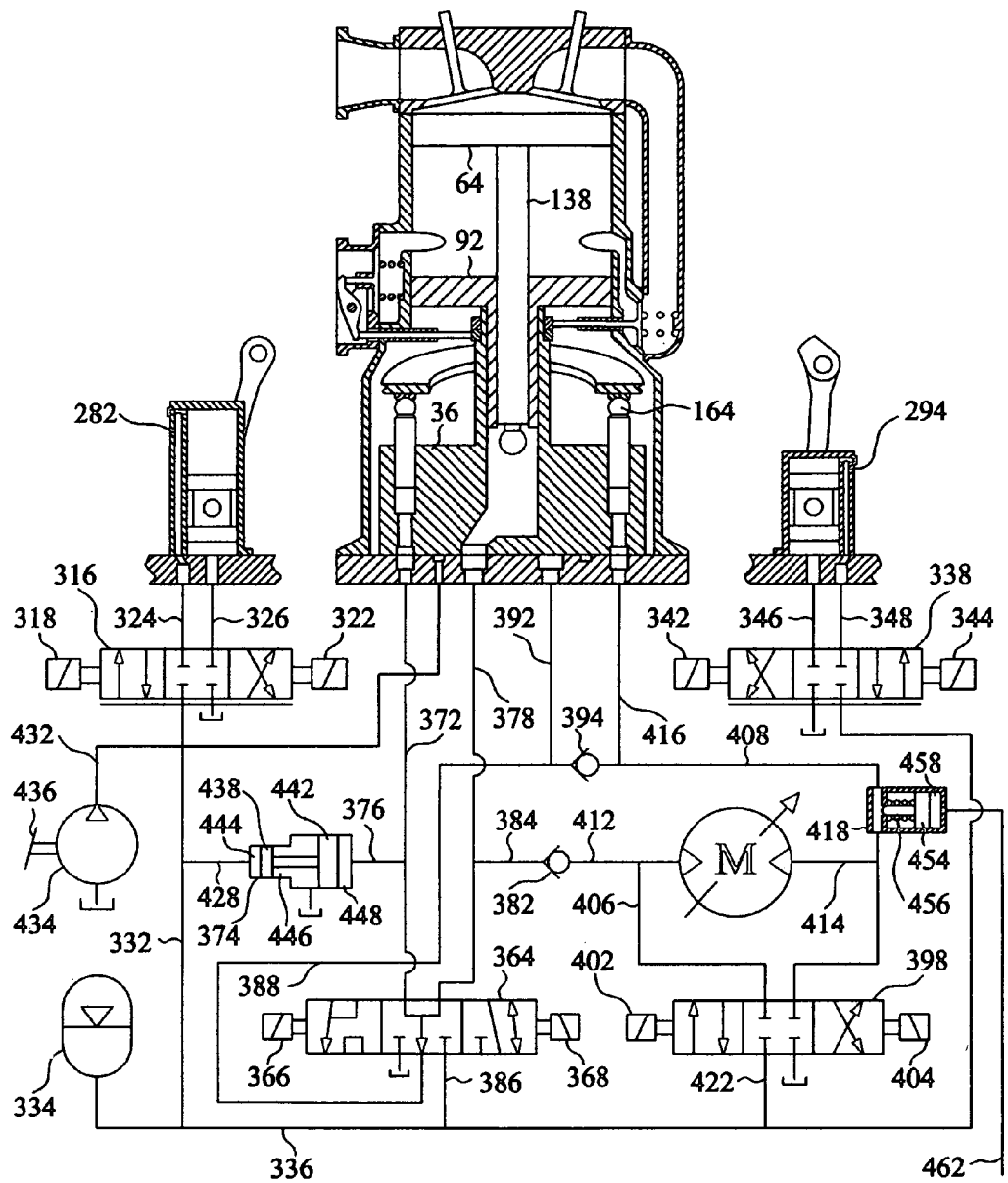
FIG. 16 shows a hydraulic diagram of the present invention.
Figure 16A:
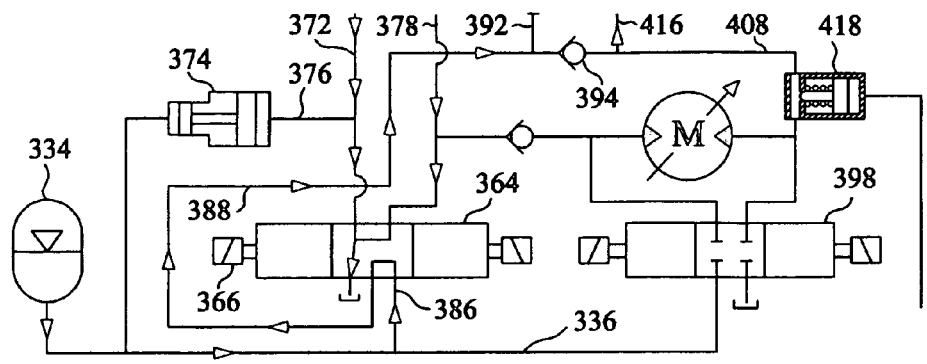
FIGS. 16A and 16B show a fluid flow diagram of the engine start respectively during the engine piston downwards and upwards movement in accordance with the present invention.
Figure 16B:
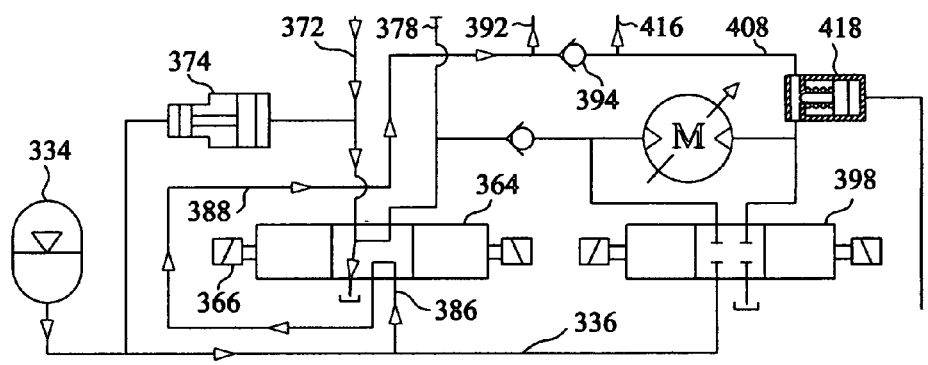

Arrows located on hydraulic lines (FIG. 16A-FIG. 16F and FIG. 16L-FIG. 16R) show the fluid flow direction in accordance with the hydraulic diagram on FIG. 16.

Figure 12:
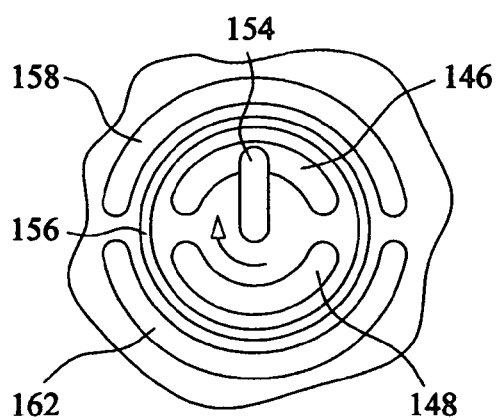
FIG. 12 shows a section along the valve plate of the present invention.
Figure 14:
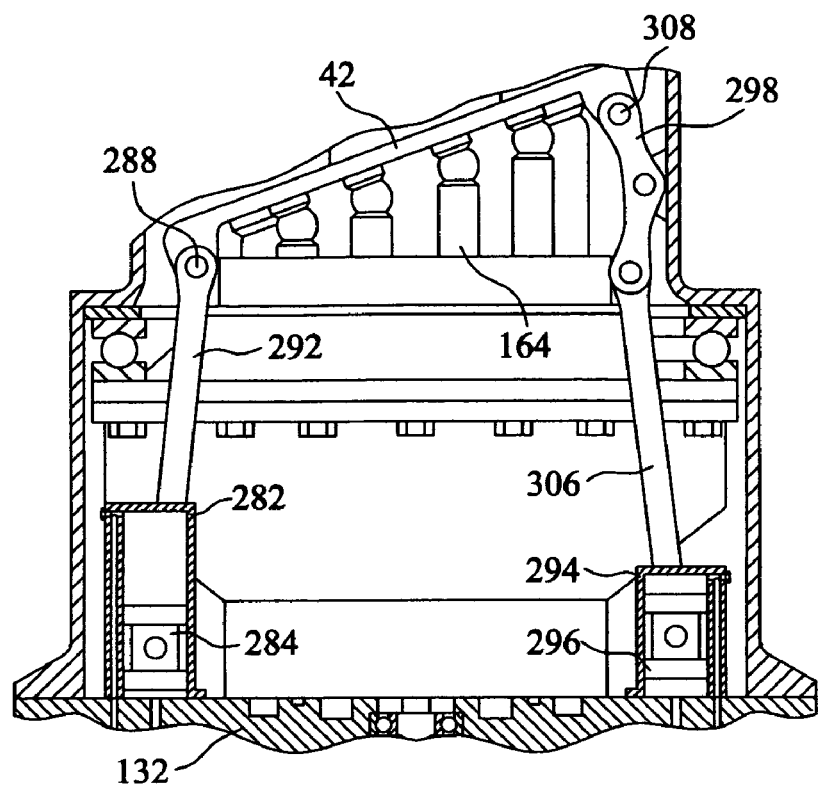
FIG. 14 is a front view of the swash plate turn and swash plate shift mechanisms of the present invention.
Figure 15:
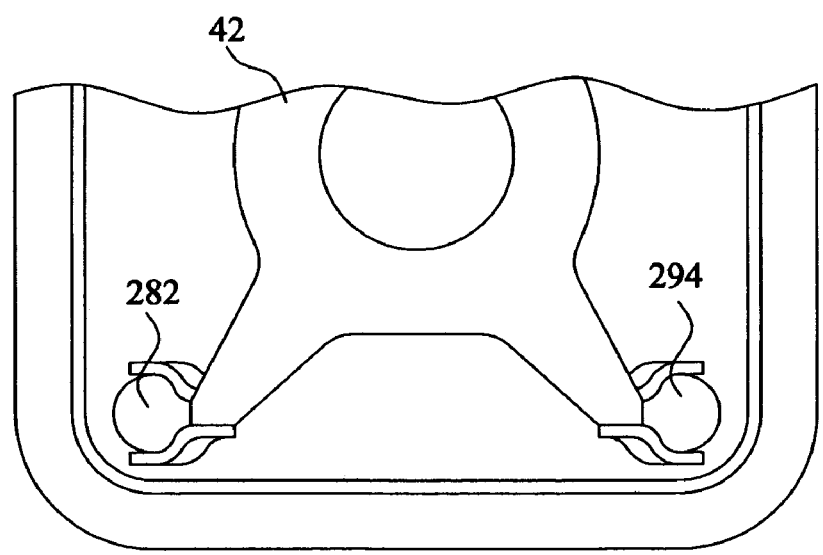
FIG. 15 is a plan of the swash plate turn and swash plate shift mechanisms of the present invention.

Arrow located on FIG. 12 shows the rotor rotation direction.

DRAWINGS - Reference Numerals

| 26 | hybrid | 28 | engine |
|----|--------|----|--------|
| 32 | compressor | 34 | pump |
| 36 | rotor | 38 | synchronize mechanism |

-continued

DRAWINGS - Reference Numerals

| | | | |
|---|---|---|---|
| 42 | swash plate | 44 | conic reducer |
| 46 | swash plate turn mechanism | 48 | swash plate shift mechanism |
| 52 | swash plate turn hydraulic system | 54 | swash plate shift hydraulic system |
| 56 | hydraulic control system | 58 | engine cylinder |
| 62 | engine cooling system | 64 | engine piston |
| 66 | engine piston rings | 68 | engine cylinder head |
| 72 | combustion chamber | 74 | engine camshaft |
| 76 | air injection valve | 78 | exhaust valve |
| 82 | exhaust manifold | 84 | compressor chamber |
| 92 | compressor piston | 94 | compressor piston rings |
| 96 | compressor piston hub | 98 | compressor intake manifold |
| 102 | compressor intake valve | 104 | compressor output valve |
| 106, 108 | springs | 112 | receiver |
| 114 | water jacket of receiver | 116 | lobe of compressor intake valve |
| 118 | rod | 122 | rocker |
| 124 | lobe of compressor output valve | 132 | valve plate |
| 134 | cylinder block of rotor | 136 | abutment of rotor |
| 138 | plunger of pump | 142 | bearing of rotor |
| 144 | disc spring | 146, 148 | slots of pump |
| 152 | chamber of pump | 154 | canal of rotor |
| 156 | circular slot | 158, 162 | autonomous slots |
| 164 | rotor's pistons | 166 | bearing of centring shaft |
| 168 | centring shaft | 172 | toothed clutch |
| 182, 184 | axial rods | 186 | yoke |
| 188, 192 | compensate pistons | 194 | lever |
| 196 | pin shoe | 198 | saddle shoe |
| 202 | floating support | 204 | ledge of floating support |
| 206, 208 | pistons of booster | 212 | drain chamber of booster |
| 214 | drain bore | 216, 218 | shoes |
| 222 | slider | 224 | axle |
| 226 | crossbar | 228 | slider |
| 232 | sliding holder | 234 | slider |
| 236 | ledge of sliding holder | 244 | canal of booster |
| 252, 254 | conic gearwheels | 256 | shaft |
| 258 | sprocket wheel | 262 | chain |
| 264 | second sprocket wheel | 266 | pulley |
| 268 | belt | 272 | bearing |
| 274 | housing | 282 | servo cylinder |
| 284 | piston | 288 | pin of swash plate |
| 292 | rod | 294 | servo cylinder |
| 296 | piston | 298 | lever |
| 306 | rod | 308 | hinge pin of swash plate |
| 316 | hydraulic distributor | 318, 322 | solenoids |
| 324, 326, 332 | hydraulic lines | 334 | pneumohydraulic accumulator |
| 336 | hydraulic line | 338 | hydraulic distributor |
| 342, 344 | solenoids | 346, 348, | hydraulic lines |
| 364 | hydraulic distributor | 366, 368 | solenoids |
| 372 | hydraulic line | 374 | hydrostatic converter |
| 376, 378 | hydraulic lines | 382 | check valve |
| 384, 386 | hydraulic lines | 388, 392 | hydraulic lines |
| 394 | second check valve | 398 | hydraulic distributor |
| 402, 404 | solenoids | 406, 408 | hydraulic lines |
| 412, 414, 416 | hydraulic lines | 418 | regenerative breaking valve |
| 422 | hydraulic line | 428, 432 | hydraulic lines |
| 434 | starter pump | 436 | pedal of starter pump |
| 438, 442 | pistons of hydrostatic converter | 444 | inlet chamber |
| 446 | drain chamber | 448 | outlet chamber |
| 454 | piston | 456 | spring |
| 458 | control chamber | 462 | hydraulic control line |

DETAILED DESCRIPTION

With reference now to the drawings, and in particular, to FIGS. 1 through 19 thereof, the preferred embodiment of the new and improved hybrid embodying the principles and concepts of the present invention will be described.

Specifically, it will be noted in the various Figures that the device relates to a hybrid for providing increased efficiency and specific power while minimizing the weight, and fuel consumption, necessary in particular for automobile hydrostatic transmission.

The monocylindrical hybrid engine, compressor and pump, further hybrid, is comprised a two-cycle engine, compressor, pump with rotor, synchronize mechanism with a pivotable swash plate, swash plate turn mechanism and the distance change mechanism between rotor centerline and the swash plate turn axis (which we shall refer to simply as "swash plate shift mechanism"), conic reducer, swash plate turn hydraulic system, swash plate shift hydraulic system, hydraulic control system associated with at least one hydrostatic motor and conventional accessory units.

The hybrid 26 (FIG. 1) is comprised of a two cycle engine 28 compressor 32, pump 34 with a rotor 36, synchronize mechanism 38 with a pivotable swash plate 42, conic reducer 44, swash plate turn mechanism 46, swash plate shift mechanism 48, swash plate turn hydraulic system 52, swash plate shift hydraulic system 54, hydraulic control system 56 associated with a conventional hydraulic motor, represented in FIG. 16 by an encircled "M" of hydrostatic transmission. The conventional accessory units not illustrated.

The engine is comprised of a cylinder 58 (FIG. 2) with cooling system 62, piston 64 with rings 66, cylinder head 68 with combustion chamber 72, camshaft 74, air injection valve 76, exhaust valve 78 and exhaust manifold 82. The engine piston located between the compressor chamber 84 and combustion chamber.

The compressor is comprised of a piston 92 with rings 94 and the compressor chamber located within the engine cylinder between the engine and compressor pistons. The compressor piston fastened to a hub 96. The compressor is comprised of an intake manifold 98, intake and output valves 102, 104 (FIG. 2, FIG. 10) with springs 106, 108, which are located on the side surface of engine cylinder. The output valve is coupled with the air injection valve of the engine by a receiver 112, which is comprised of a water jacket 114 and located on the side surface of engine cylinder. The compressor intake valve is connected with the one lobe 116 by means of rod 118 and pivotably mounted rocker 122. The compressor output valve is connected with the second lobe 124 and both lobes fastened to pump's rotor.

Figure 4:
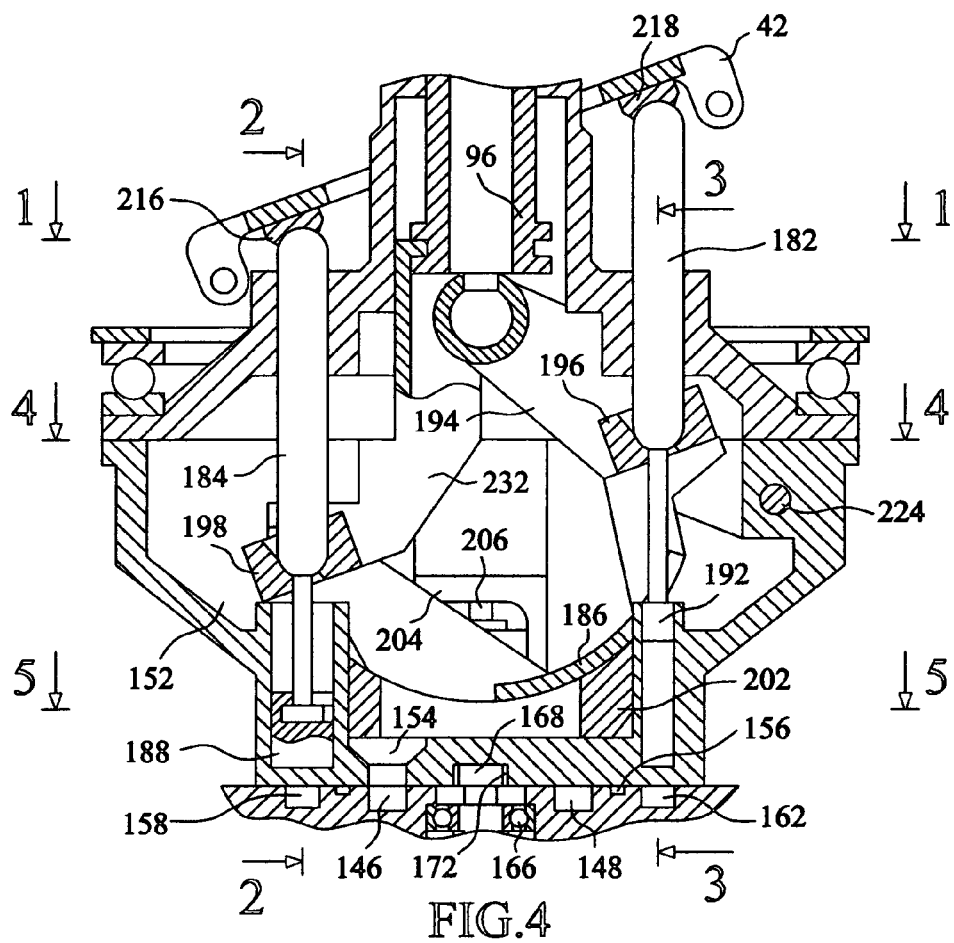
FIG. 4 shows a section in detail along of axial rods axis of the present invention.
Figure 5:
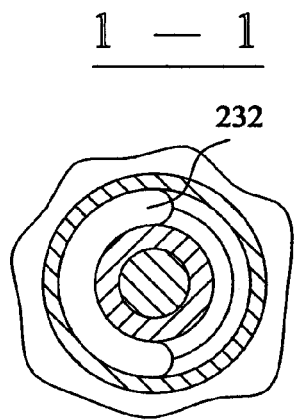
FIG. 5 is a view in detail of the portion indicated by the section lines 1-1 in FIG. 4.
Figure 6:
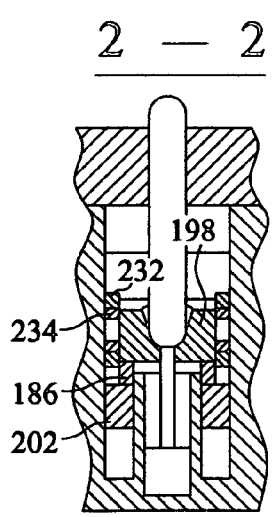
FIG. 6 is a view in detail of the portion indicated by the section lines 2-2 in FIG. 4.
Figure 7:
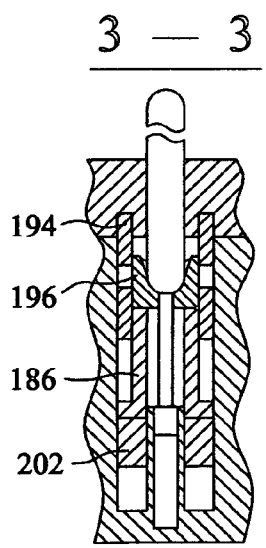
FIG. 7 is a view in detail of the portion indicated by the section lines 3-3 in FIG. 4.
Figure 8:
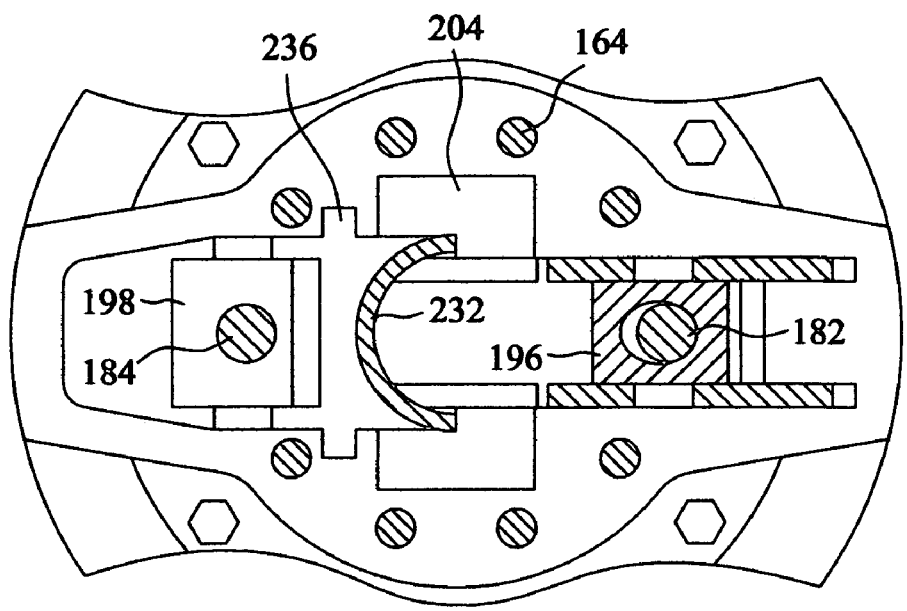
FIG. 8 is a view in detail of the portion indicated by the section lines 4-4 in FIG. 4.
Figure 9:
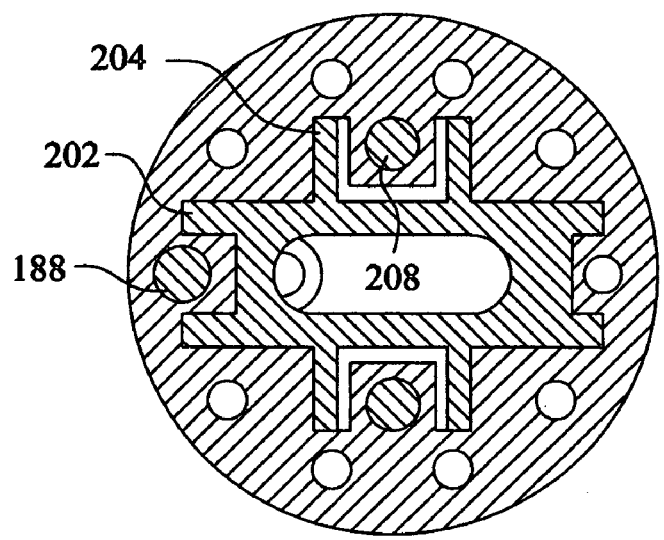
FIG. 9 is a view in detail of the portion indicated by the section lines 5-5 in FIG. 4.
Figure 10:
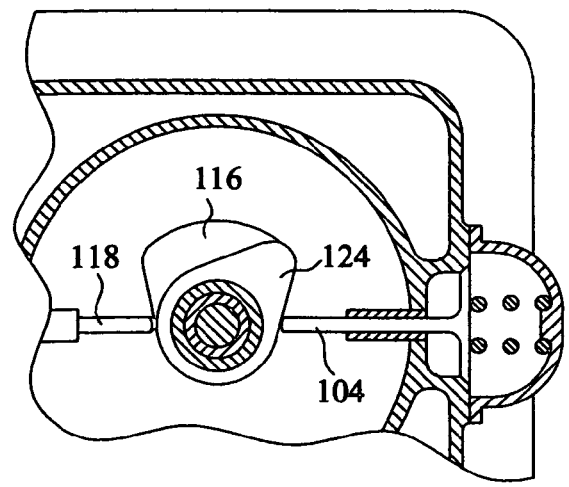
FIG. 10 shows a cross section of cylinder along the compressor output valve of the present invention.
Figure 11:
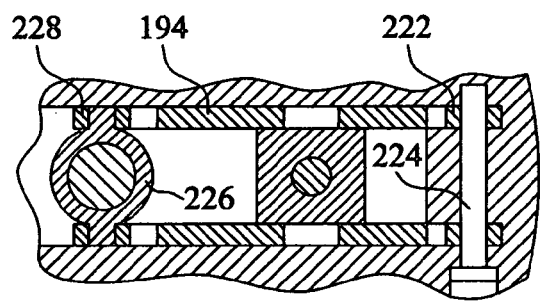
FIG. 11 shows a section along the lever of the synchronize mechanism of the present invention.
Figure 13:
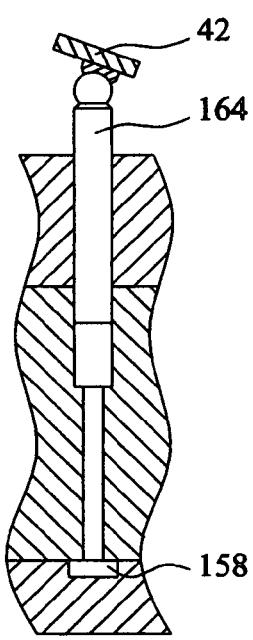
FIG. 13 shows a section along the axis of the stabilizer hydraulic motor piston of the present invention.

The pump housing is the engine cylinder and joined to a valve plate 132. A pump's rotor is comprised of a cylinder block 134 fastened to an abutment 136, and a plunger 138 fastened to the engine piston. The plunger, rotor, compressor piston and hub located coaxially. The rotor is coupled with the engine cylinder by a bearing 142 with a disc spring 144. The valve plate is comprised a pump inlet and outlet slots 146, 148 (FIG. 2, FIG. 4) forming the circumference (FIG. 12) and coupled with the pump chamber 152 by the rotor canal 154 (FIG. 4). The valve plate also comprised circular slot 156 and autonomous slots 158, 162 forming the circumference (FIG. 12). The autonomous slots association with a rotor's pistons 164 (FIG. 2, FIG. 8, FIG. 13) formed stabilizer hydraulic motor connected in series with said pump and at least one hydrostatic transmission motor represented in FIG. 16 by an encircled "M". The rotor coupled with the valve plate by bearing 166 (FIG. 4) and centring shaft 168 with toothed clutch 172.

The synchronize mechanism is comprised two diametrically opposite axial rods 182, 184 of the rotor (FIG. 3, FIG. 4), yoke 186, compensate pistons 188, 192, lever 194, pin shoe 196 and saddle shoe 198. The yoke coupled with rotor by floating support 202 (FIG. 2, FIG. 6, FIG. 7) having ledge 204 and booster's pistons 206, 208 (FIG. 2) connected within chamber 212 having drain bore 214. Axial rods coupled with compensate pistons inside of the rotor and coupled with the swash plate by shoes 216, 218 (FIG. 4) outside of the rotor.

Figure 1:
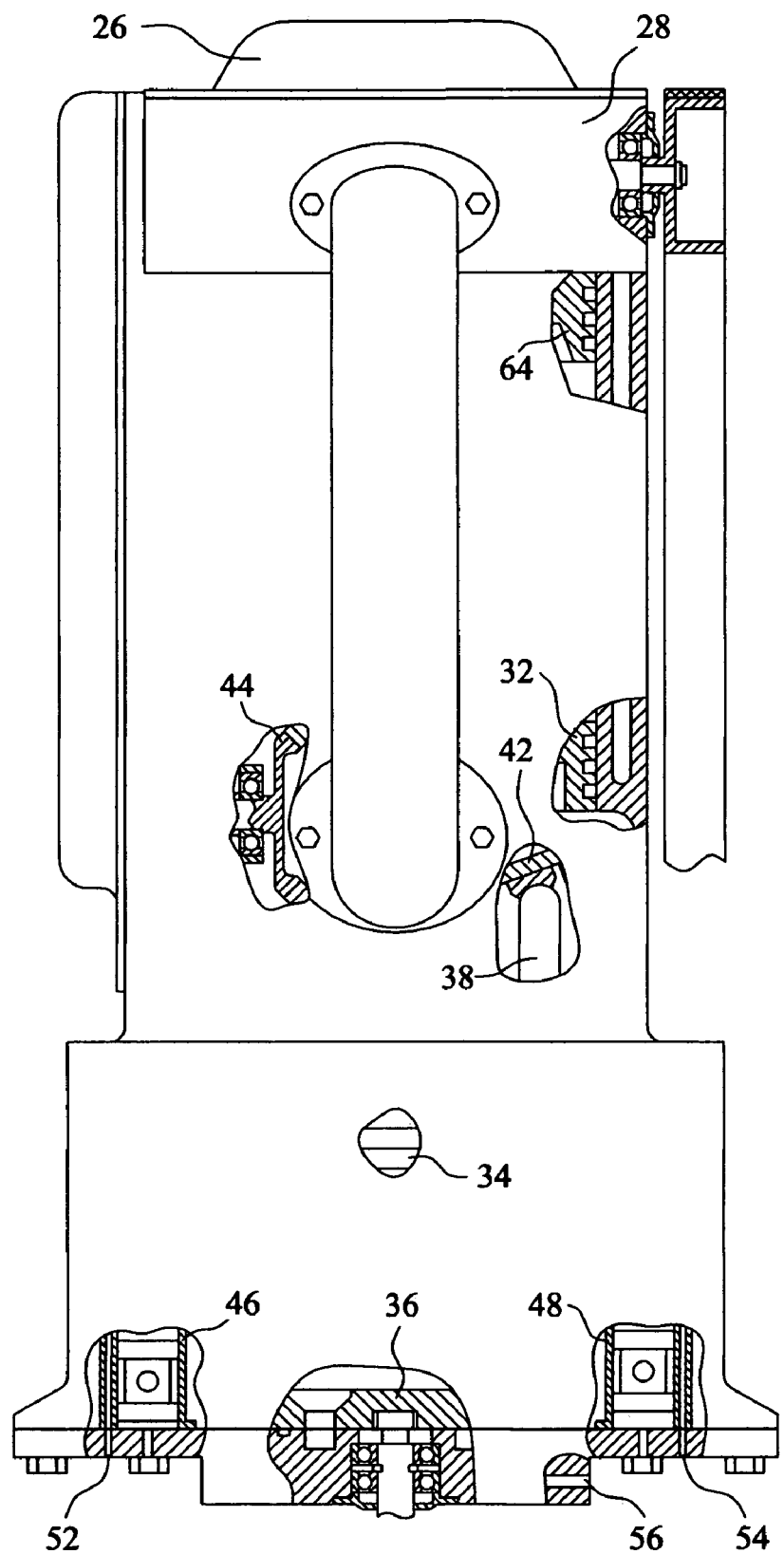
FIG. 1 shows a preferred embodiment of the monocylindrical hybrid in accordance with the principles of the present invention.
Figure 2:
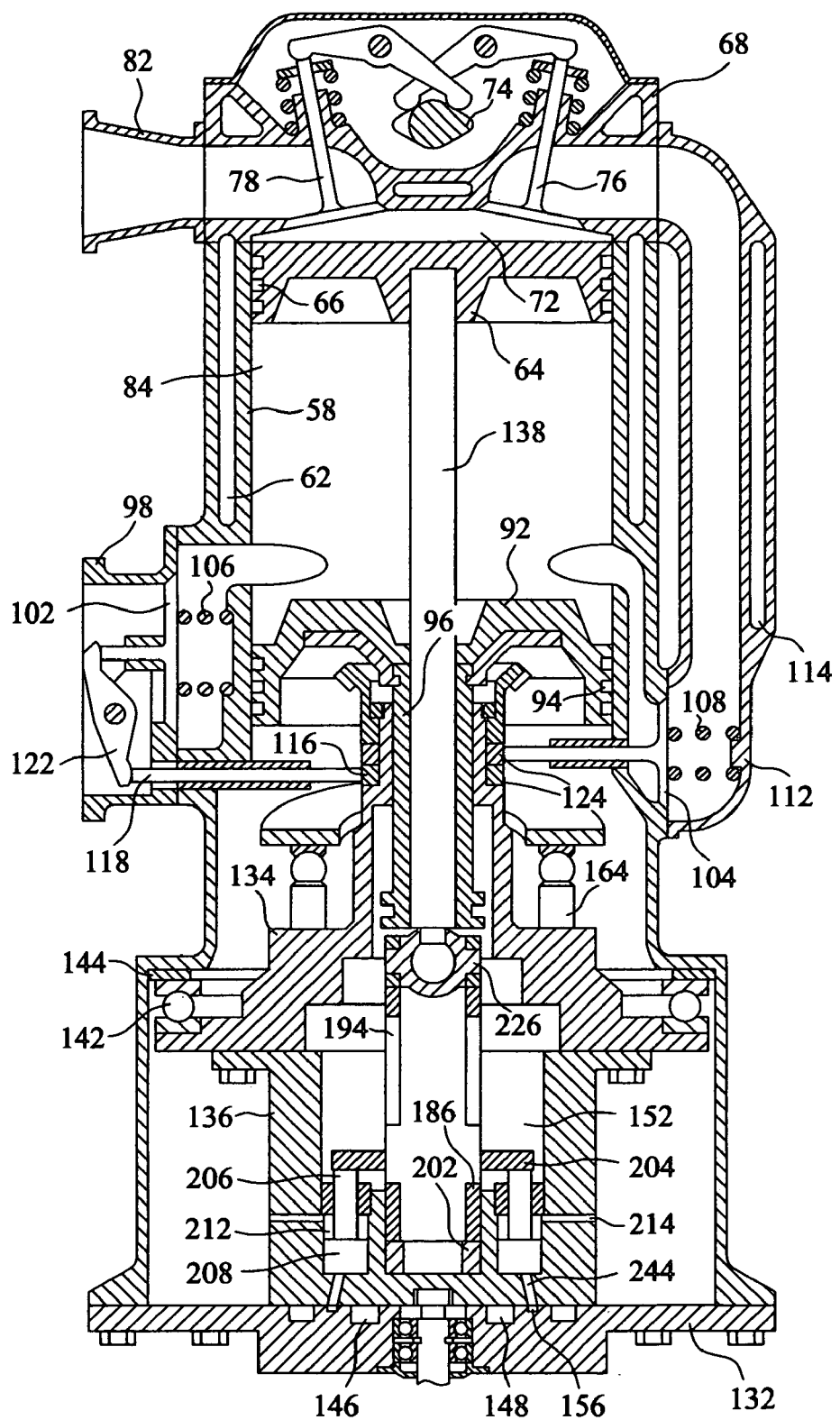
FIG. 2 shows a section along the engine cylinder axis and engine and compressor valves axis of the present invention.
Figure 3:
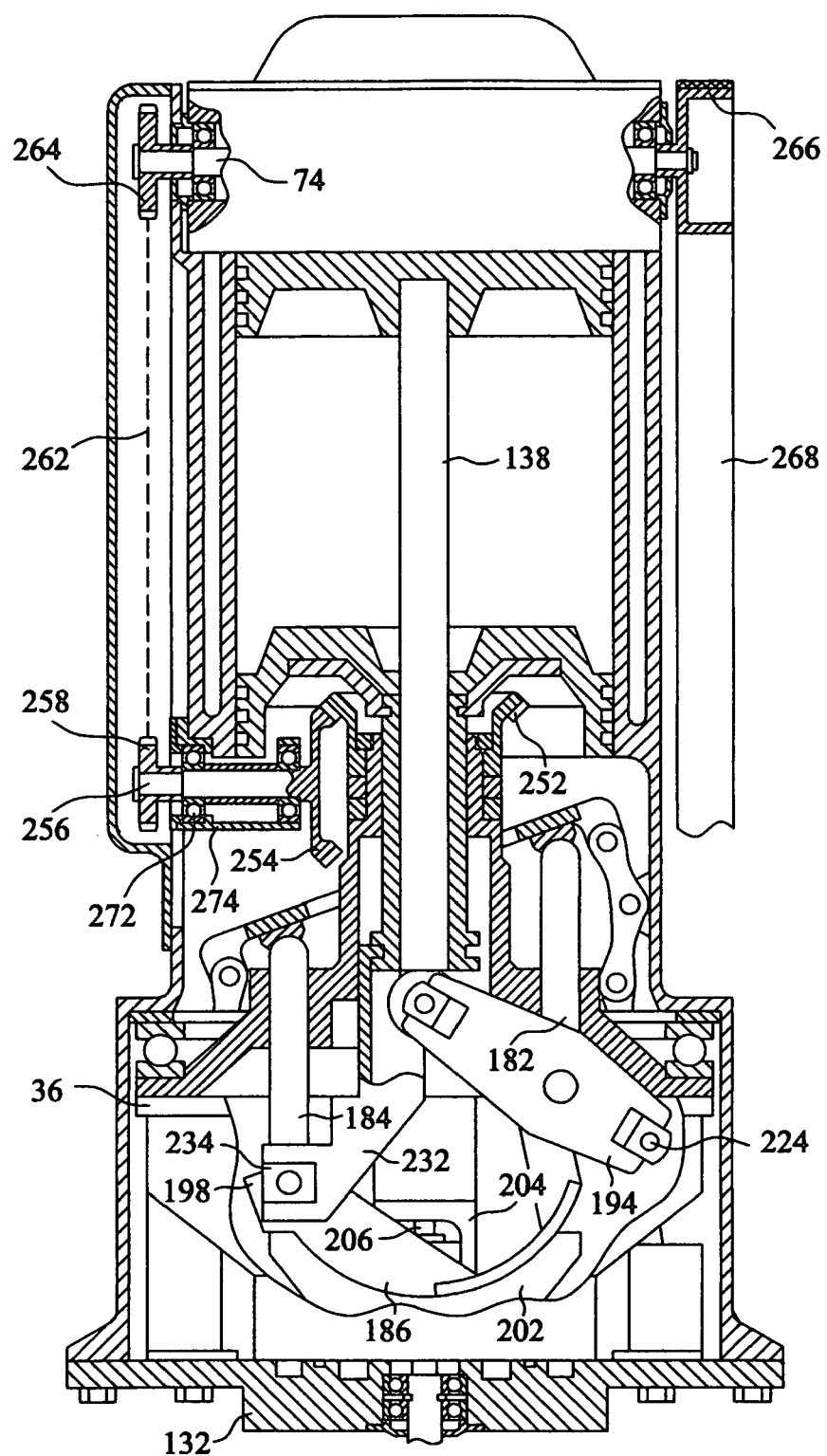
FIG. 3 shows a section along the engine cylinder axis and axial rods axis of the present invention.

The first axial rod 182 pivotably coupled with the plunger by the pin shoe and lever. The lever pivotably coupled with the rotor by sliders 222 and axle 224 (FIG. 11), pivotably coupled with a crossbar 226 by sliders 228 and pivotably coupled with the yoke by pin shoe. The second axial rod 184 pivotably coupled with compressor piston's hub 96 and yoke by a saddle shoe and sliding holder 232 with slider 234 (FIG. 3, FIG. 4, FIG. 5, FIG. 8) inside of the rotor. The sliding holder connected to the rotor by means of ledges 236 (FIG. 8) mounted within rotor's guide grooves. The yoke pivotably coupled with floating support 202 (FIG. 3, FIG. 4). and coupled with rotor by booster's pistons different diameter. The floating support connected to the rotor by means of ledges 204 (FIG. 8) mounted within rotor's guide grooves. The greater piston of the booster hydraulicly coupled within rotor with circular slot 156 by canal 244 (FIG. 2).

The conic reducer's first gearwheel 252 (FIG. 3) is fastened to the rotor and the second conic gearwheel 254 mounted on one shaft 256 with a first sprocket wheel 258 associated by means of chain 262 with a second sprocket wheel 264 fastened to said engine camshaft, which on opposite side of the engine comprises a pulley 266 associated with an accessory units by means of the belt 268. The second conic gearwheel, shaft with bearings 272, first sprocket wheel and housing 274 formed modular assembly fastened to the engine cylinder. The accessory regular units (not illustrated)—cooling system pump, electric system generator, steering pump, associated with the belt.

The swash plate turn mechanism is comprised servo cylinder 282 (FIG. 14, FIG. 15) with piston 284. The swash plate pin 288 pivotably coupled with servo cylinder piston by rod 292. The servo cylinder fastened to the valve plate.

The swash plate shift mechanism is comprised of a servo cylinder 294 (FIG. 14, FIG. 15) with piston 296 and lever 298. The swash plate pivotably coupled with servo cylinder piston by lever 298, rod 306 and hinge pin 308. The servo cylinder fastened to the valve plate and the lever pivotably coupled with the engine cylinder.

The swash plate turn hydraulic system is comprised of a hydraulic distributor 316 with solenoids 318, 322 (FIG. 16). A first and second lines 324, 326 of the distributor is connected with the servo cylinder, third line is coupled with the tank and the fourth line 332 is coupled with pneumohydraulic accumulator 334 by line 336.

The swash plate shift hydraulic system is comprised of the hydraulic distributor 338 with solenoids 342, 344 (FIG. 16). A first and second lines 346, 348 of the distributor is connected with the servo cylinder, third line 336 is coupled with the pneumohydraulic accumulator 334 and the fourth line of the distributor is coupled with the tank.

The hydraulic control system of hybrid is comprised of a first hydraulic distributor 364 with solenoids 366, 368 (FIG. 16) The first line 372 of the distributor is connected with the stabilizer motor outlet and with the hydrostatic converter 374 outlet by line 376; second line 378 is coupled with a pump outlet and coupled with check valve 382 inlet by line 384; third line 386 is coupled with the line 336; fourth line 388 is coupled with a pump inlet line 392 and the second check valve 394 inlet and the fifth line of the distributor is coupled with the tank.

The second hydraulic distributor 398 with solenoids 402, 404, first and second lines 406, 408 coupled respectively with inlet and outlet of the hydrostatic motor, represented in (FIG. 16) by an encircled "M" by lines 412, 414. The line 412 coupled with the check valve 382 outlet. The line 408 coupled with the second check valve 394 outlet and coupled with stabilizer motor inlet line 416 by means of the normally connecting regenerative braking valve 418. The third line of the second hydraulic distributor 398 is coupled with the tank and the fourth line 422 is coupled with the line 336.

The pneumohydraulic accumulator by lines 336, 332, 428, 432 coupled with the hydrostatic converter inlet, coupled with the circular slot of the valve plate and a starter pump 434, which comprises of a pedal 436. The hydrostatic converter 374 comprises two different diameter pistons 438, 442 and inlet chamber 444, drain chamber 446 and outlet chamber 448. The regenerative breaking valve 418 comprising piston 454, spring 456 and control chamber 458 with hydraulic control line 462 associated with automotive conventional break system (not illustrated).

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

Description of Operation.

The hybrid has starting, restarting, idling and work mode of operation. Also the hybrid provides automotive start acceleration, automotive regenerative braking, pneumohydraulic accumulator (PHA) charging by means of engine power operation and by means of muscle efforts, automotive emergency ahead and reverse movement by means of PHA energy.

The operator initiates the start. Switching from start to idle mode is automatic. The work mode is initiated automatically after the accelerator pedal (not illustrated) is depressed. The PHA also is charged automatically.

Engine Start.

The operator switches on the solenoid 366 (FIG. 16, FIG. 16A, FIG. 16B) by key ignition (not illustrated). The distributor 364 switches from neutral to the "start" position and connects line 386 with 388 and lines 372, 378 with tank. The distributor 398 is in neutral position.

During the starting process pressurized fluid goes from the PHA 334 by the lines 336, 386, 388, 416 via the distributor 364 and check valve 394 to the stabilizer motor inlet. The pressurized fluid activates the stabilizer motor independent of the engine piston direction movement and goes to the tank along line 372 from the stabilizer motor outlet. During the engine piston downwards motion (FIG. 16A) the fluid goes from the pump and stabilizer motor outlets to the tank without load. The engine piston upwards motion (FIG. 16B) activates the fluid goes from the PHA to the pump inlet line 392 and stabilizer motor inlet.

The stabilizer motor by pistons 164 (FIG. 13) interacting with swash plate 42 rotates the rotor, which activate engine and compressor valves and axial rods. The axial rod 184 (FIG. 3, FIG. 4, FIG. 6) by saddle shoe 198, sliders 234, sliding holder 232 and hub 96 moves the compressor piston to bottom end position (BEP) and simultaneously rotating the yoke 186 relatively to the rotor moves the pin shoe 196 with axial rod 182 to top end position (TEP). The pin shoe 196 rotates the lever 194 (FIG. 3, FIG. 4 FIG. 11) relatively to axle 224 within pump chamber. The lever by sliders 228 and crossbar 226 moves the plunger with engine piston to top end position. The engine piston compresses the air in the combustion chamber, and conventional fuel injection (not illustrated) initiates the power stroke of the engine.

Arrow (FIG. 12) shows the rotor rotation direction and the rotor canal 154 shows schematic.

The rotor by conic reducer gearwheels 252, 254 (FIG. 3) shaft 256, sprocket wheels 258, 264 and chain 262 activate the engine camshaft, which by means of the pulley with belt actuate conventional accessory units: cooling system pump, electric system generator, replenishing pump of hydrostatic transmission, diesel injection pump (not illustrated).

During one half revolution, while the rotor canal 154 connects with the pump inlet slot, the outlet slot is closed. During the second half revolution, while the rotor canal connects with the pump outlet slot, the inlet slot is closed. Such sequences occur in the all the operating modes.

Thus the stored PHA energy provides of the monocylindrical engine start up by means of activating jointly the stabilizer motor (in capacity of the starter) and pump plunger during the engine piston upwards motion and activating the stabilizer motor during the engine piston downwards motion. So operates a high-power hydraulic starter. The starter is able to fast start and restart of the single cylinder engine and enables us to replace the conventional electric starter motor and the alternator.

The high pressure fluid enables a quiet starting process to occur, and also enables an engine to shut down at every red traffic light with decreased fuel consumption. This is very valuable in particular for automobiles' hydrostatic transmission.

If the fluid pressure in the PHA is not sufficient the starter pump 434 (FIG. 16) with the pedal 436 provide an opportunity to increase fluid pressure with muscle efforts. Thus, the hydraulic system enables one to start and restart engine independent of any external energy sources such as an electric battery, for example, thus providing the autonomous work of a hybrid and engine start, irrespective of parking time.

Idling Mode.

The rotor angular velocity increases after the start up. A speed sensor (not illustrated) switches off the solenoid 366 (FIG. 16, FIG. 16C, FIG. 16D) and the distributor 364 in the neutral, "idling," position connects the lines 372, 378, 388. The distributor 398 is in the neutral position all lines closed. The engine automatically switches from starting mode to the idling mode.

During the engine piston downwards motion (FIG. 16C) the fluid goes from the pump outlet via the line 378. During the engine piston upwards motion (FIG. 16D) the fluid goes to the pump inlet and the pump outlet is closed.

Figure 16C:
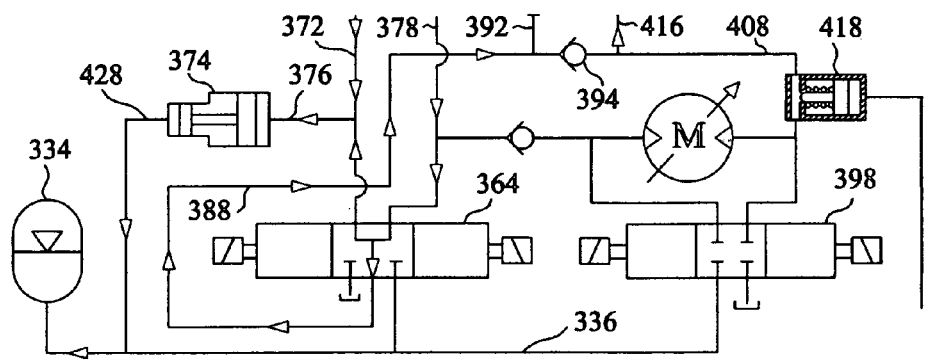
FIGS. 16C and 16D show a fluid flow diagram of the engine idling respectively during the engine piston downwards and upwards movement in accordance with the present invention.
Figure 16D:
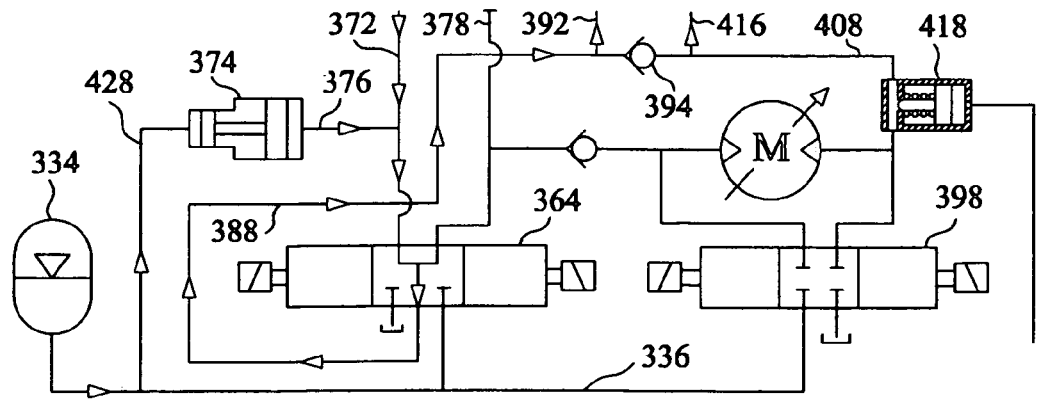

The pump displacement volume approximately equals the stabilizer motor displacement volume. During the half rotor revolution (the engine piston downwards motion) the pump supply is the all pump displacement volume but the stabilizer motor intake is only half of the pump volume. Because the pump and stabilizer motor coupled in series by lines 378, 388, 408, 416, distributor 364 and check valve 394 the pump's fluid volume surplus entered the hydrostatic converter via lines 372,376 and distributor 364 (FIG. 16C). During the next half rotor revolution (the engine piston upwards motion) this fluid volume goes from the hydrostatic converter to the pump and stabilizer motor inlets via lines 376, 372, 388, 392, 408, 416 (FIG. 16D) and check valve 394.

So occurs the engine piston return stroke by means of the hydrostatic converter used the PHA energy and activated the stabilizer motor and pump plunger upwards movement.

The hydrostatic converter outlet fluid pressure is much smaller, than the fluid pressure of the hydrostatic converter inlet in accordance with the hydrostatic converter ratio. This determines high efficiency idling mode.

Figure 17A:
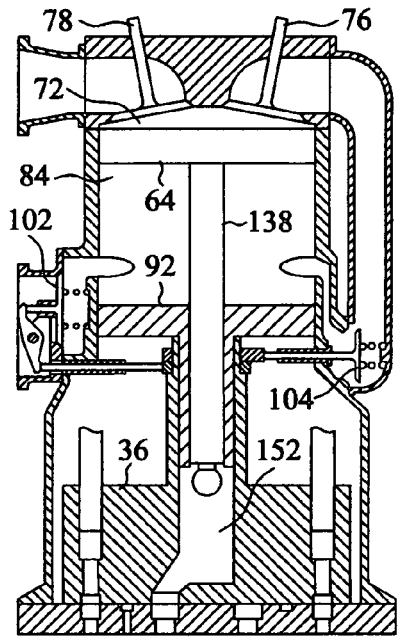
FIGS. 17A to 17D show an operating sequence of hybrid in accordance with the present invention.

The energy of combustion pressure is transmitted to the piston-plunger during its movement from the TEP to BEP. This process is illustrated in FIG. 17A. The engine valves 76, 78 are closed. The compressor intake valve 102 is closed and the output valve 104 is open.

The piston-plunger assisted by the crossbar 226, (FIG. 2, FIG. 4, FIG. 11) the sliders 228 and the lever 194 (FIG. 4) moves the pin shoe 196 also downward, from the TEP to BEP. The pin shoe turns the yoke 186, which by the saddle shoe 198 depresses the opposite axial rod 184 and shoe 216 against the swash plate 42. The interaction of the shoe 216 with the swash plate 42 rotates the rotor. The crossbar 226 rotates together with the rotor relative to the plunger sphere, and is actually a bearing, because the plunger is not rotating. Simultaneously the yoke 186 activates the compressor piston movement from BEP to TEP, assisted by saddle shoe 198, sliding holder 232 and hub 96. The sliding holder and hub is actually a bearing because the compressor piston is not rotating.

Thus the synchronize mechanism transforms the reciprocating movement of the piston-plunger into rotor rotation, and provides the opposite movement of engine and compressor pistons. The rotor drives the engine camshaft by the conic gearwheels 252, 254 (FIG. 3), shaft 256, sprocket wheels 258, 264 and chain 262. The rotor rotates the lobe 116 (FIG. 2, FIG. 10) activating the compressor intake valve 102 by rod 118 and rocker 122 and rotates the lobe 124 activating the compressor output valve 104.

So the synchronize mechanism provides the engine and compressor valves with motion, with consequent performance in compliance with a two-stroke working cycle; and each engine piston stroke from TEP to BEP is a power stroke.

The movement of all components of the synchronize mechanism in oil within pump chamber provides high quality lubrication and increase the efficiency.

The yoke rotates simultaneously about two different axes. One axis is the axis of the rotor. The other axis is the axis of the cylindrical surface floating support 202 (FIG. 3, FIG. 4) which perpendicular to the rotor axis. The yoke rotates about the latter axis and provides a constant distance between the swash plate and the yoke's flat surface in the plane of the axial rod centerlines independent of the swash plate incline angle. Also this occurs irrespective of the magnitude or direction of the forces acting on the pistons or plunger.

A lines connecting the center of upper and lower spherical portion of the axial rods formed parallelogram. This rotating parallelogram defines the synchronized movement of the piston-plunger, compressor piston and rotor within cylinder.

The compressor piston and axial rod have equal strokes. The lever gives the piston-plunger an increased stroke, in accordance with the lever ratio.

Thus the opposing movement of the compressor and the engine pistons allows the space under the engine piston to function as chamber of the compressor. This ensures, that the noise is decreased, because static energy is used, that is air pressure, instead of air high speed, i.e. kinetic energy as in a conventional blower. Because the pistons are moving in opposing directions, the engine piston becomes in essence a compressor piston. This results in direct energy transmission for air compression, and provides increased efficiency.

The opposing movement provides simple and high-quality balancing of the system because the compressor piston compensates for the inertial forces influencing the piston with plunger. This decreases the vibration.

The pistons' opposing movement provides a compressor displacement volume greater than the volume of the engine, because it is formed by the superposition of the motions of the engine and compressor pistons. This increases air mass intake and specific power of the engine. The idling mode continues as long as the accelerator pedal is not depressed.

Work Mode.

Figure 16E:
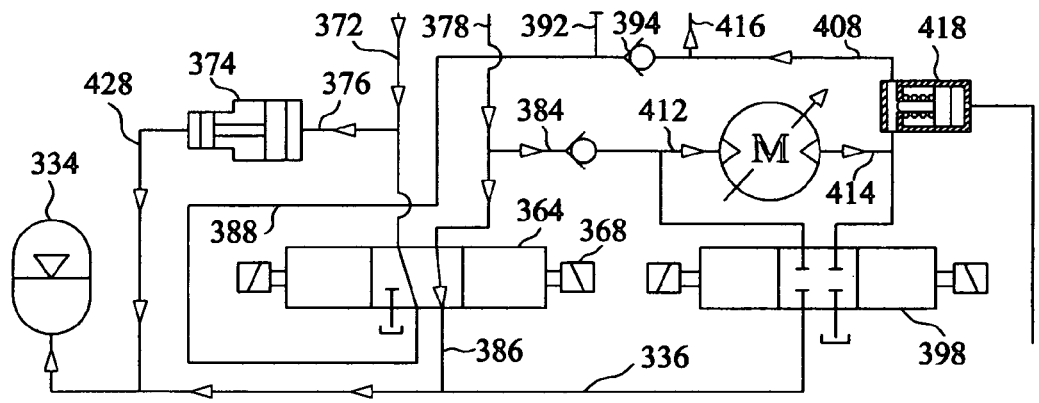
FIGS. 16E and 16F show a fluid flow diagram of the engine work operation respectively during the engine piston downwards and upwards movement in accordance with the present invention.
Figure 16F:
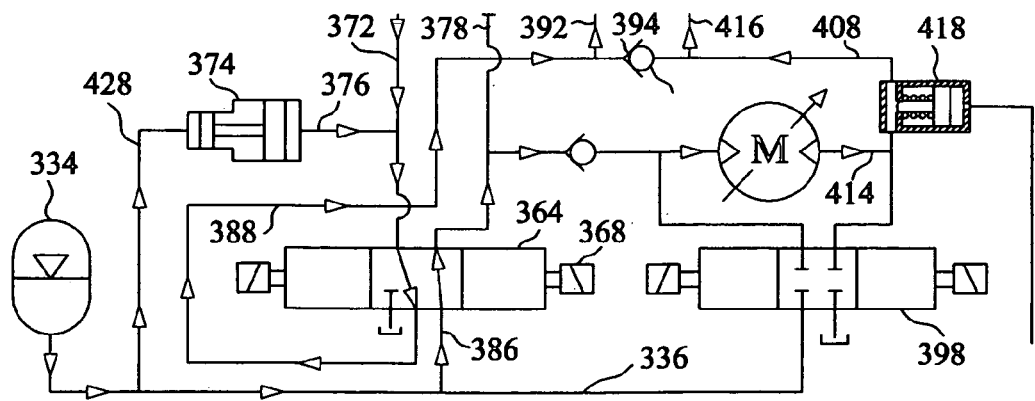

The accelerator pedal (not illustrated) depression increases the rotor angular velocity and a speed sensor (not illustrated) switches on the solenoid 368 (FIG. 16, FIG. 16E, FIG. 16F). The distributor 364 switches to the "work" position and connects the line 378 with 386 and line 372 with 388. Thus the distributor automatically switches from idling to work mode if the accelerator pedal is depressed.

The FIGS. 17A, 17B, 17C, 17D illustrates the hybrid operating sequence during a single revolution of the rotor (two cycles of the engine).

The FIG. 17A shows the piston-plunger power stroke from TEP to BEP and simultaneously the compressor piston power stroke with motion in opposite directions. The engine valves 76, 78 are closed, the compressor output valve 104 is open and the intake valve 102 is closed.

Figure 16G:
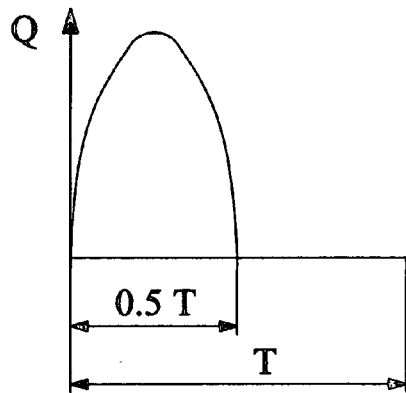
FIG. 16G is a diagram illustrating the pump supply during the one cycle of the engine operation in accordance with the present invention.
Figure 16H:
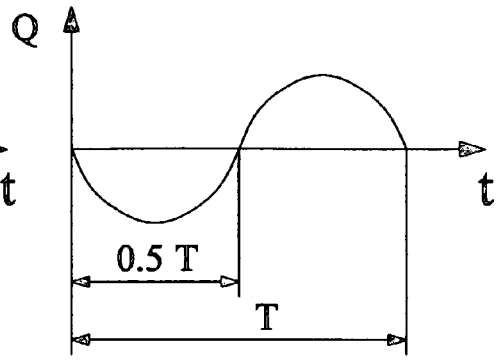
FIG. 16H is a diagram illustrating the pneumohydraulic accumulator fluid flow during the one cycle of the engine operation in accordance with the present invention.
Figure 16J:
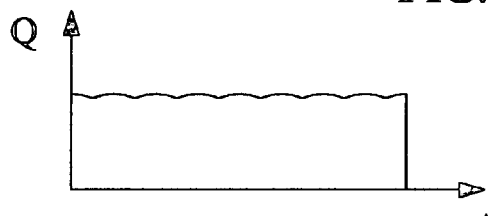
FIG. 16J is a diagram illustrating the fluid flow via hydrostatic motor in accordance with the present invention.

The pressurized fluid flow goes from the pump outlet via lines 378, 384 and check valve 382 (FIG. 16E, the engine piston downwards motion) to the motor "M" inlet and via lines 408, 416 to the stabilizer motor inlet. The pump and the stabilizer motor displacement volume approximately equal. During the half cycle the pump supply is equal the pump displacement volume but the stabilizer motor intake is only half of the pump volume because the pump and stabilizer motor coupled in series. The fluid volume surplus via lines 378, 386, 336 and distributor 364 entered the PHA 334. Also the fluid entered PHA from hydrostatic converter via line 428. During the next half cycle (FIG. 16F, the engine piston upwards motion) this fluid volume surplus entered the motor "M" inlet from the PHA 334 via lines 336, 386, 378, 384, 412, check valve 382 and distributor 364. Diagrams in figures FIG. 16G, FIG. 16H, FIG. 16J show this process. The T is one cycle time. The Q is supply of pump—FIG. 16G, hydrostatic converter—FIG. 16H, hydrostatic motor—FIG. 16J.

Simultaneously the fluid goes from hydrostatic converter outlet via lines 376, 372, 388, 392 to the pump inlet, provides necessary suction fluid pressure and provides return stroke of the engine piston. Thus occurs transforming the single pump plunger supply pulsation into uniform fluid flow feeding said hydrostatic motor "M" during said engine power operation by means of pump outlet in parallel connection to the pneumo-hydraulic accumulator and hydrostatic motor "M", which coupled in series with said stabilizer hydraulic motor. The uniform fluid flow via motor "M" shows FIG. 16J.

This allows use of one simple monocylindrical hybrid instead of expensive, complicated and heavy multi-cylinder engine, compressor and a pump.

So occurs the engine piston return stroke by means of the hydrostatic converter fluid pressure actuated of the pump plunger upwards movement without intermediate mechanism. This provides of the single engine cylinder autonomous operation. The hydrostatic converter outlet fluid pressure is much smaller, than the fluid pressure of the hydrostatic converter inlet in accordance with the hydrostatic converter ratio. Because direct energy transmission the engine piston return stroke occurs with minimum energy losses and minimum specific fuel consumption. Also this decreases weight, cost and installation space of the hybrid.

The energy of combustion pressure is transmitted to the piston-plunger during its movement from the TEP to the BEP during a half revolution of the rotor.

The greatest part of the power flow is the high pressured fluid flow which goes directly from the pump outlet to the motor "M".

The pump plunger fixed to the engine piston provides direct energy transmission. This allows use of one simple unit hybrid instead of two complicated and heavy regular units (an engine and a pump). Also the hybrid solves the problem of using reciprocating engine and compressor without a crankshaft or connecting rods. This increases efficiency and decreases fuel consumption.

The compensate pistons 188, 192 (FIG. 4) interact with the axial rods in the pump chamber, reducing the forces which press the axial rods against the swash plate. This increases both the efficiency and the rotor rotation speed. The pump plunger disposition on the rotor's centerline allows a considerable increase in rotor speed rotation and transmission power in comparison with a conventional pump.

All these factors enable us to increase the pump power to equal the maximum engine power.

The second, and much smaller, part of the power flow uses the interaction of the underside of the engine piston with the compressor piston to compress air in the compressor chamber 84 (FIG. 2) and in the receiver 112. The compressor piston motion is provided by fluid pressure on the hub 96 in the pump chamber 152 simultaneously with the pump power stroke, without cross forces. The hub 96 with sliding holder 232 (FIG. 3) and with axial rod association provides a synchronized function. The air compression with direct energy transmission by means of the fluid pressure increases efficiency and decreases fuel consumption. The additional air cooling by the receiver water jacket 114 (FIG. 2) increases the engine thermal efficiency and decreases fuel consumption.

The third and smallest part of the power flow is transmitted to an engine and compressor valves and accessory units.

The location of the piston-plunger (inside the cylinder and simultaneously inside the hub 96) and the absence of cross forces as it moves, allow the engine piston length to be minimized. The location of the compressor piston and the hub (simultaneously within the. cylinder and the rotor) allows the compressor piston length to be minimized. This provides a compact design, minimizes piston mass and forces of inertia.

In work mode, the synchronize mechanism provides movement of the compressor piston and the rotation of the rotor, in synchronization with the piston-plunger movement, irrespective of the engine load or rate of acceleration.

Thus the power strokes of the engine, pump and compressor are taking place simultaneously, with direct energy transfer, without any intermediate mechanisms and without a cross force influence from the pistons or the plunger. This minimizes and simplifies the design, and increases the longevity and the efficiency of the hybrid.

In the hybrid, the weight and installation space are smaller than in the conventional system engine-pump thanks to the direct energy transmission.

The synchronize mechanism provides the engine and compressor valves with motion, with consequent performance in compliance with a two stroke working cycle; and each engine piston stroke from TEP to BEP is a power stroke. The piston-plunger in BEP and the compressor piston in TEP simultaneously complete their power stroke. The air is compressed in the receiver to maximum pressure.

The piston-plunger movement from BEP to TEP (FIG. 17B, FIG. 17C, FIG. 17D) occurs simultaneously with the compressor piston movement from TEP to BEP, during a half revolution of the rotor. The compressor intake valve 102 is open, the output valve 104 is closed and the air is sucked into the compressor chamber. Simultaneously the fluid goes to pump inlet from the hydrostatic converter outlet chamber.

Because of its location on the side surface of the cylinder, the compressor intake valve diameter can be made much larger than the intake valve of a regular engine, with equal displacement volume. The intake air is cooler because it does not pass through the combustion chamber as with a conventional engine. This increases volumetric efficiency and air mass in the compressor chamber. Such joint factors improve the engine operation in all conditions and particular at low atmospheric pressure, for example, high above sea level.

The engine piston movement from BEP to TEP is comprised of three successive processes: combined clearing, joint compression, and finish compression (of the air in case of diesel, or of the mixture in case of gasoline engine) by the engine piston.

Figure 17B:
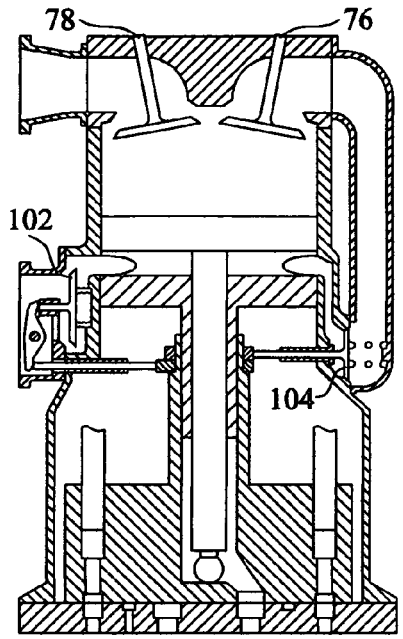

The combined clearing process is shown in the FIG. 17B.
There are three factors in the combined clearing process.
The valves 76, 78 are open. The piston-plunger moves from BEP to TEP and displaces the burned gases (the first factor). Simultaneously, high pressurized air, injected from the receiver through the open valve 76 also displaces the burned gases (the second factor). The clearing process provides the high-pressurized air, which was compressed in the previous stroke while the engine piston moved downward.

This combined action intensifies the exhaust process and increases the volumetric efficiency. The additional cooling (intercooling) of air by the water jacket of the receiver is the third factor. Thus the three joint factors improve the filling process (of the air in case of diesel, or of the mixture in case of gasoline engine) and increase the specific power of the engine. The combined clearing process ends when the exhaust valve is closed.

Figure 17C:
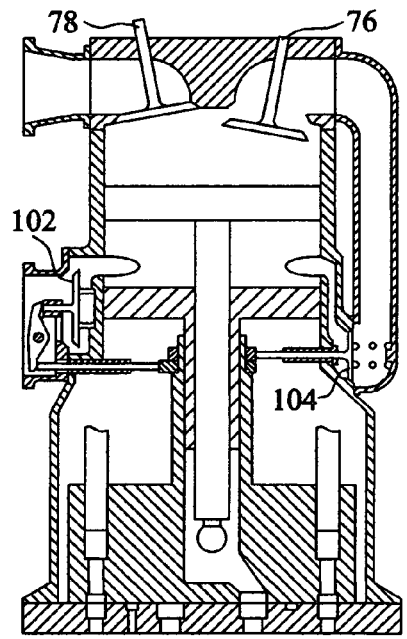

The joint compression process is shown in the FIG. 17C.
The exhaust valve is closed and the air injection valve 76 is open. The engine piston continues movement, and, jointly with the air injection, increases air pressure in the cylinder because the air pressure within the receiver is greater than that within the combustion chamber. The joint compression process ends when the injection valve is closed.

Figure 17D:
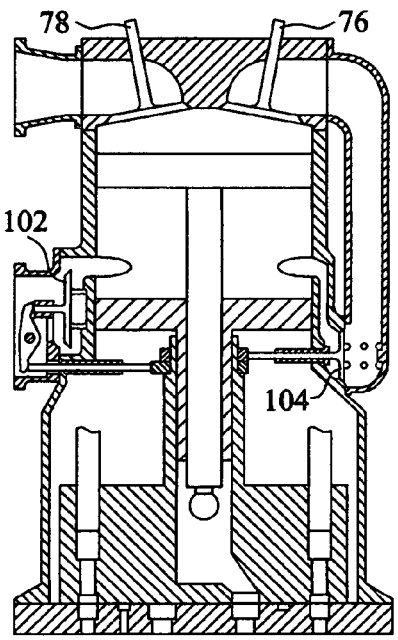

The finish compression process is shown in the FIG. 17D.
The valves 76, 78 are closed. The engine piston continues compression. Before TEP, the pressure in the cylinder becomes maximum. A conventional fuel injection system (not illustrated) provides the start of the engine power stroke. The working cycle ends after one rotor revolution.

Thus the two-cycle engine of the hybrid uses inexpensive four cycle engine cylinder head, with the intake valve functioning as an air injection valve. This valve replaces conventional two-cycle engine cylinder wall air ports, and improves the two-cycle engine operation. This solves the problem of boosting the two-cycle engine power by super high pressurized air injection and enables to realize a great potential possibility of a two-cycle engine—at least twice the specific power of a four-cycle engine with other things being equal.

The PHA high pressure fluid goes via circular slot 156 and canals 244 to booster pistons pressing said floating support and synchronize mechanism components against the swash plate and provides hybrid operation independent of the swash plate shift and incline angle change. This determines the booster pistons diameters ratio and provides the engine, compressor and pump operation with variable displacement volume.

The engine, compressor and pump operation is the function of the two independent arguments: first—the swash plate angle, second—the distance between the rotor centerline and the swash plate hinge pin axis. The first argument determines the engine, compressor and pump displacement volume. The second argument determines the engine compression ratio. The widely known engine compression ratio determines the kind of fuel (fuel octane rate) and determines a very important requirement: the engine compression ratio must be independent of the engine displacement volume change while the engine operates with the given fuel. This requirement executes in full the monocylindrical hybrid synchronize mechanism in accordance with the next proof.

Figure 18A:
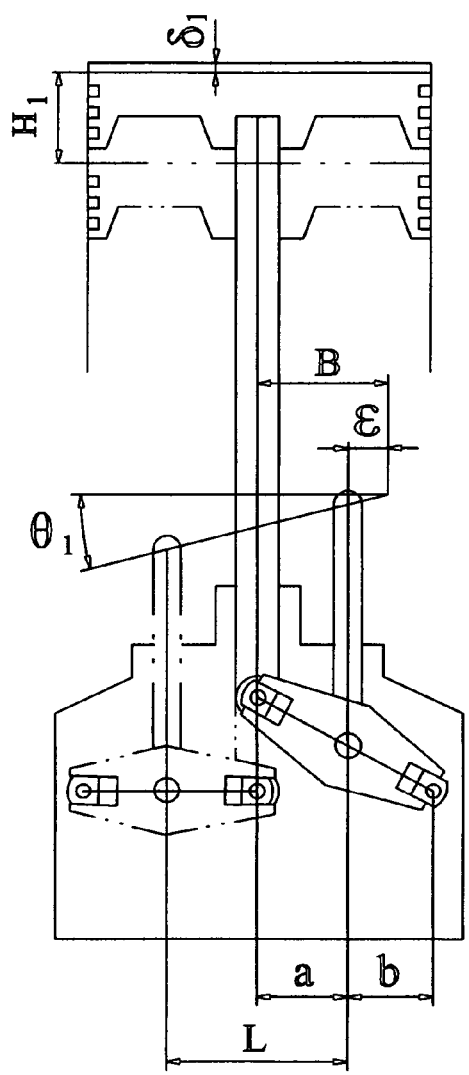
FIG. 18A is a kinematical diagram, which shows minimum engine displacement volume of the hybrid in accordance with the present invention.
Figure 18B:
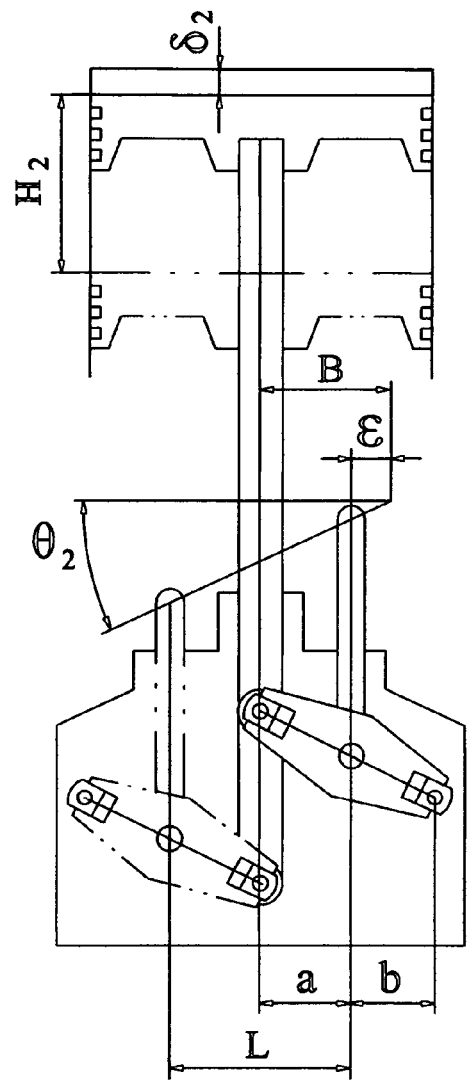
FIG. 18B is a kinematical diagram, which shows maximum engine displacement volume of the hybrid in accordance with the present invention.

The proof of the engine displacement volume changing independent of the engine compression ratio (see FIG. 18A, 18B).

The universal hybrid compressor piston stroke h per half rotor revolution is equal to the axial rod stroke and in accordance with the widely know axial mechanism is $$h = L \tan \Theta \quad (1)$$

where L is the distance between axial rod axis $\Theta$ is the swash plate angle The engine piston stroke H greater than the compressor piston stroke h in accordance with the lever ratio $i=(a+b)/b$ where a, b is the lever arms $$H = ih = iL \tan \Theta \quad (2)$$

where H is the engine piston stroke
The widely now engine compression ratio $\Lambda$ is $$\Lambda = (\delta + H)/\delta \quad (3)$$

where $\delta$ is the engine piston clearance
Let's swash plate hinge pin axis dispose on the line connecting an axial rod sphere centers.

$$\text{If } \Theta = 0: H = 0 \text{ and } \delta = 0 \quad (4)$$

The engine piston clearance $\delta$ is $$\delta = i \epsilon \tan \Theta \quad (5)$$

here $\epsilon$ is the distance between the axial rod axis and the swash plate hinge pin axis
The equations (2), (3), (4) and (5) gives the engine compression ratio.

$$\Lambda = 1 + L/\epsilon \quad (6)$$

Because $\epsilon = B - L/2$ (7)

where B is the distance between the rotor centerline and the swash plate hinge pin axis the equations (6) and (7) gives the engine compression ratio.

$$\Lambda = (2B+L)/(2B-L) \text{ hence} \quad (8)$$

$$B = L(\Lambda+1)/2(\Lambda-1) \quad (9)$$

The proof gives us:
1. The engine compression ratio is independent of the swash plate angle $\Theta$ in accordance with equation (8). This is because both the engine piston stroke H and the clearance $\delta$ is proportional to the swash plate angle tangent (see equations 2 and 5). This provides the engine operation with the variable displacement volume and invariable compression ratio during the swash plate angle $\Theta$ alteration (moveable pin) while the swash plate hinge pin is fixed (B=const).
2. The engine compression ratio is dependent on the distance B between the rotor centerline and the swash plate hinge pin axis in accordance with equation (8). This enables the different kind of fuel use and the engine transformation into an omnivorous engine by means of the distance B alteration.

The example of the distance B depending on the engine compression ratio:

Lets the engine with the distance between axial rod axis L=60 mm works with the compression ratio $\Lambda=10$ and the equation (9) gives B=36.7 mm.

Lets the other fuel requires the engine compression ratio two times greater with $\Lambda=20$ and the equation (9) gives B=33.2 mm.

This example illustrate that the distance B small change gives great engine compression ratio alteration. Also this example illustrates the effective and easy method of the engine transformation into an omnivorous engine by means of the distance B alteration (moveable hinge pin).

The FIG. 18A illustrates the minimum engine displacement volume in accordance with the minimum swash plate angle $\Theta$ incline. The FIG. 18B illustrates the maximum engine displacement volume in accordance with the maximum swash plate angle $\Theta$ incline.

The swash plate turn mechanism and swash plate turn hydraulic system realizes the possibility of the engine operating with the variable displacement volume and the invariable engine compression ratio while the swash plate hinge pin is fixed (B=const).

The swash plate shift mechanism and swash plate shift hydraulic system realizes the possibility of the engine operating with a different kind of fuel, and the engine becomes, in essence, an omnivorous engine.

The engine, compressor and pump variable displacement volume gives the additional ability of adapting the engine power to the automotives wider variable load and speed range.

The engine and compressor displacement volume simultaneously increase gives the additional ability of adapting the engine power to the automotives wider variable load and speed range.

The hydrostatic motor and stabilizer motor connection in series enable said hydrostatic motor displacement volume to control automatic by stabilizer motor inlet fluid pressure to maintain permanent independent of the engine load and cycle per min.

The engine, compressor and pump variable displacement volume provides of the engine operation with the minimum specific fuel consumption during the automotives wider variable load and speed range.

Figure 19A:
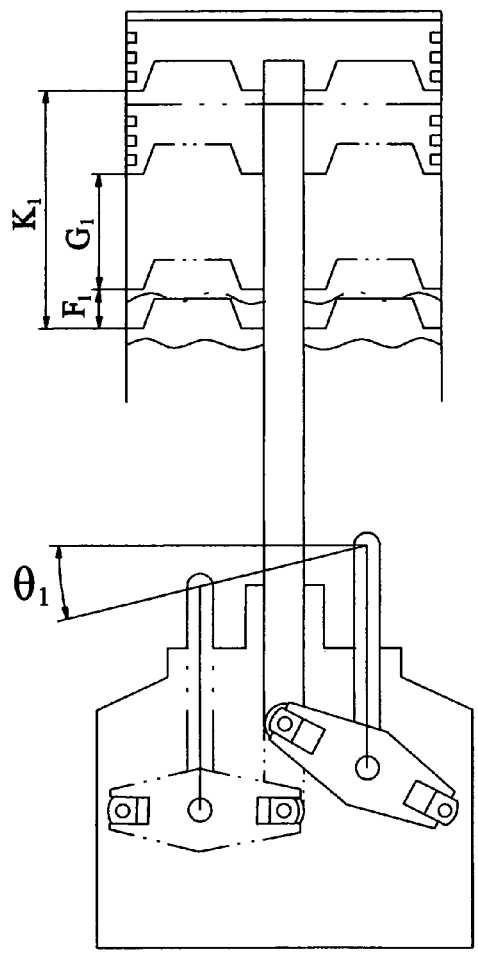
FIG. 19A is a kinematical diagram, which shows minimum engine, compressor and pump displacement volume of the hybrid in accordance with the present invention.

The FIG. 19A illustrates the compressor piston stroke $F_1$ and the distance between compressor and engine pistons change from $G_1$ to $K_1$ during the half rotor revolution. This distance change determines the compressor displacement volume and the compressor compression ratio in accordance with the swash plate angle $\Theta_1$ incline.

Figure 19B:
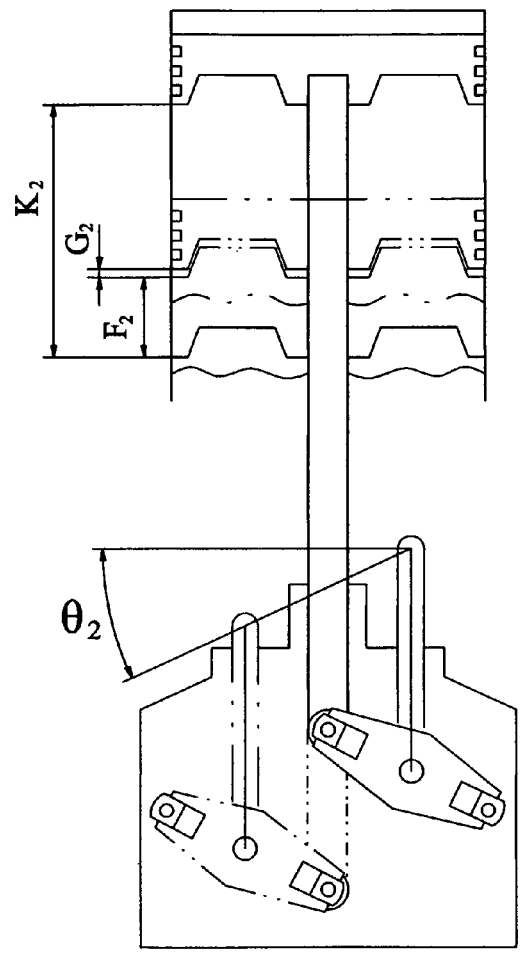
FIG. 19B is a kinematical diagram, which shows maximum engine, compressor and pump displacement volume of the hybrid in accordance with the present invention.

The FIG. 19B illustrates the compressor piston stroke $F_2$ and the distance between compressor and engine pistons change from $G_2$ to $K_2$ during the half rotor revolution. This distance change determines the compressor displacement volume and the compressor compression ratio in accordance with the greater swash plate angle $\Theta_2$ incline.

The FIG. 19B by comparison with the FIG. 19A illustrates the compressor displacement volume and the compressor compression ratio increase simultaneously with the swash plate angle and the engine displacement volume increase.

All these factors combine to provide use of the progressive hydrostatic transmission with variable displacement volume of the engine, compressor, pump and hydrostatic motor instead of widespread automotive engine and automatic transmission, thereby minimizing the weight, installation space, cost, labor and fuel consumption.

Automotive Start Acceleration

Figure 16K:
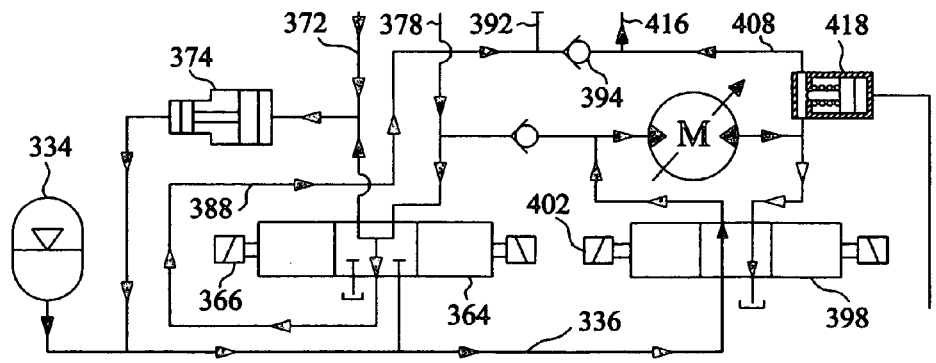
FIGS. 16K and 16L show a fluid flow diagram of the automotive start acceleration respectively during the engine piston downwards and upwards movement in accordance with the present invention.
Figure 16L:
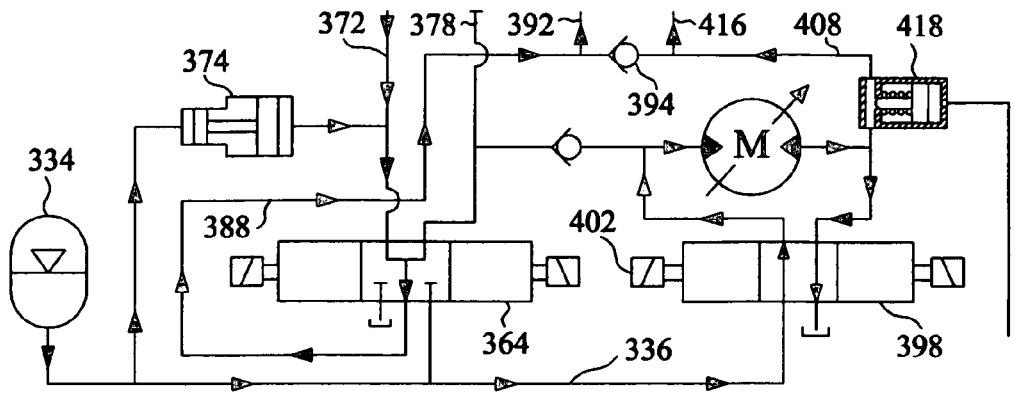
Figure 16M:
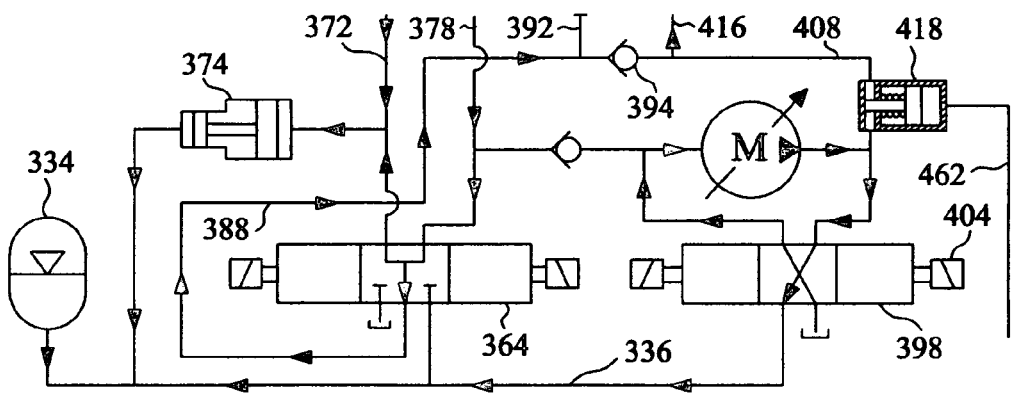
FIG. 16M shows a fluid flow diagram of the automotive regenerative braking in accordance with the present invention.

The hybrid provides automotive start acceleration by means of the PHA energy use. The operator depresses the accelerator pedal and the on board computer (not illustrated) switches on the solenoid 402 (FIG. 16, FIG. 16K, FIG. 16L). The distributor 398 switches from neutral to the "automotive start acceleration" position and connects the PHA with the hydrostatic motor "M" by lines 336, 406, 412. The distributor 364 in the neutral position provides the engine idling operation.

The hydrostatic motor "M" uses the pneumohydraulic accumulator energy and drives the automotive independent of the engine mode operation because the check valve 382 closed. The FIG. 16K shows this during the engine piston downwards motion and the FIG. 16L shows this during the engine piston upwards motion.

Thus the stored PHA energy provides high power, high efficiency and noiseless automotive acceleration with the minimum fuel consumption. Also this provides the high efficiency progressive hydrostatic transmission use. The signal from the pneumohydraulic accumulator fluid pressure sensor (not illustrated) and on board computer automatic switches on the solenoid 368 of the engine power operation and the engine jointly with the PHA provides the automotive acceleration if the operator continues to depress the accelerator pedal. The stored PHA energy solves the problem to use of a smaller capacity engine than the conventional car engine for providing the same acceleration.

The PHA energy use for the automotive acceleration is the kind of energy recuperation method, which solves the problem considerable to decrease the fuel consumption.

Automotive Regenerative Braking.

The operator depresses the break pedal and the fluid pressure in the control line 462 (FIG. 16, FIG. 16M) switches the regenerative braking valve 418 to the position closed the line 408. Simultaneously the on board computer (not illustrated) switches on the solenoid 404 and the distributor 398 in the "automotive regenerative braking" position connects line 336 with line 408 and line 406 with tank. The automotive movement drives by transmission the shaft (not illustrated) of the hydrostatic motor "M", which in pump mode delivers fluid to the PHA via lines 414, 408, 336 and distributor 398. Simultaneously the distributor 364 in the neutral position provides the engine idling operation.

Thus transforms the automotive kinetic energy into the PHA potential energy. This increases the automotive brake system life and accumulates energy for the subsequent automotive acceleration. This solves the problem to use of a smaller capacity engine than the conventional car engine for providing the same acceleration.

The regenerative braking is the kind of energy recuperation method, which considerable decreases the fuel consumption.

Pneumohydraulic accumulator charging (the hydrostatic motor "M" shaft is stopped).

Figure 16N:
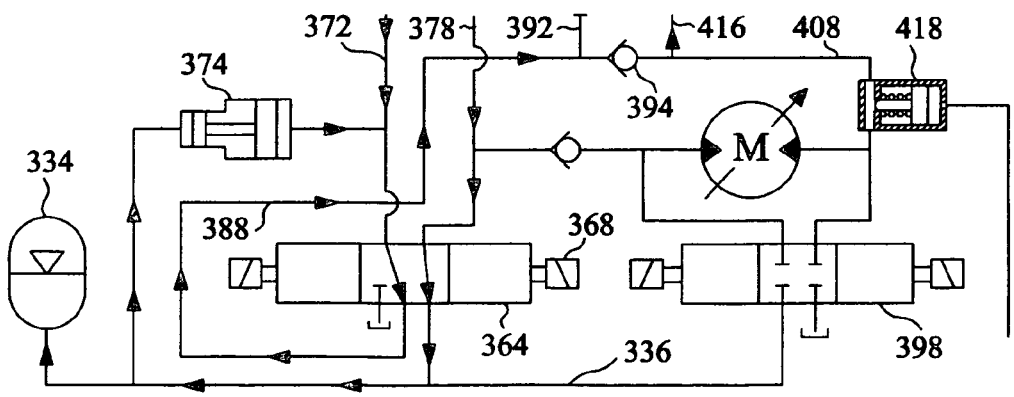
FIGS. 16N and 16P show a fluid flow diagram of the pneumohydraulic accumulator charge by means of the engine power operation respectively during the engine piston downwards and upwards movement in accordance with the present invention.
Figure 16P:
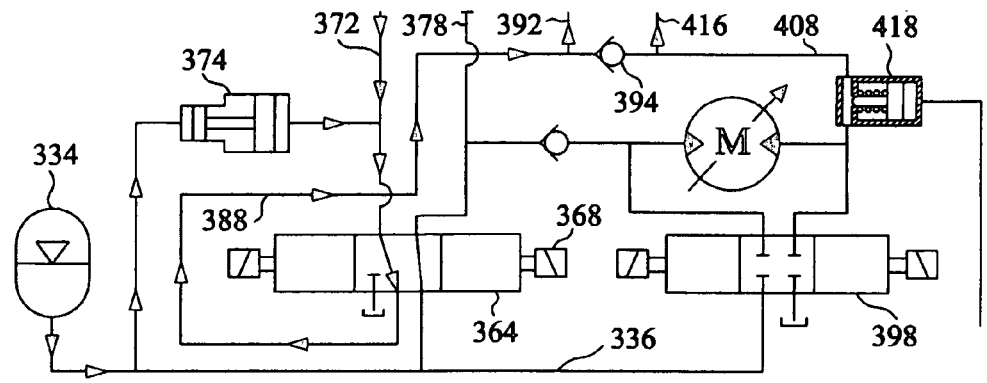
Figure 16Q:
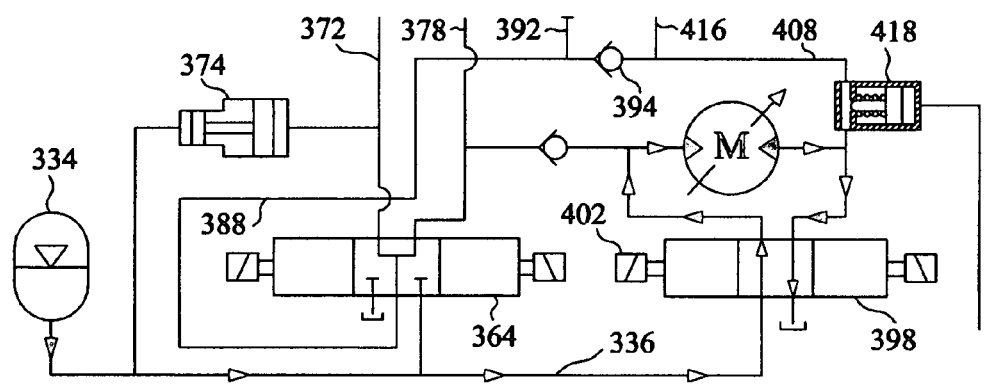
FIGS. 16Q and 16R show a fluid flow diagram of the emergency automotive movement respectively ahead and reverse by means of the pneumohydraulic accumulator energy in accordance with the present invention.
Figure 16R:
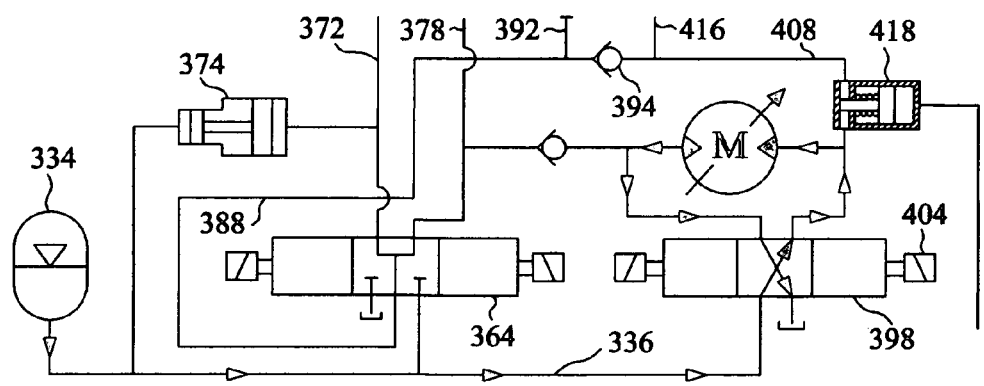

The PHA fluid pressure decrease determines the signal from the fluid pressure sensor (not illustrated) and on board computer (not illustrated) automatic switches on the solenoid 368 (FIG. 16, FIG. 16N, FIG. 16P). The distributor 364 switches to the "work" position and connects the pump outlet line 378 with the PHA by line 336.

The fluid goes from the pump outlet directly to the PHA (FIG. 16N) during the engine piston downwards motion. The engine piston upwards motion (FIG. 16P) provides the fluid supply from the hydrostatic converter which inlet chamber simultaneously receives fluid from PHA. Thanks to hydrostatic converter ratio the fluid volume entered PHA during the engine piston downwards motion much greater than the fluid volume goes from PHA during the engine piston upwards motion. Thus the PHA fluid pressure increases during one cycle. The signal from the fluid pressure sensor switches off the solenoid 368 and the distributor 364 switches to the neutral position when the fluid pressure achieves maximum.

Thus the engine charges the PHA automatically. The hybrid solves the problem of charging a PHA automatically, irrespective of the parking time, even if the fluid pressure is greatly decreased. In that situation, a sensor uses the magnitude of PHA fluid pressure as an automatic control signal, and switches the distributor solenoid instead of the previously described process of "start", "idling" and "work" (which require action by an operator). The engine fast charges the PHA and automatically switches off when fluid pressure reaches a maximum. The starter pump 434 (FIG. 16) by means of the pedal 436 provides an opportunity to increase fluid pressure with muscle efforts in the emergency case. Thus the hybrid readies the engine for next high power, fast start. The pneumohydraulic accumulator charging as the energy recuperation kind considerable decreases the fuel consumption.

Automotive Emergency Movement.

The monocylindrical hybrid system provides the automotive ahead and reverse (FIG. 16, FIG. 16Q, FIG. 16R) movement in emergency occasion by means of the PHA energy use if dead engine. The solenoid 402 (FIG. 16Q) switches the distributor 398 for the automotive emergency movement ahead by means of the hydrostatic motor "M" used PHA energy independent of the stopped engine. The solenoid 404 (FIG. 16R) switches the distributor 398 for the automotive emergency movement reverse in accordance with hydraulic diagram FIG. 16.

All hybrid advantages enable us considerable to decrease the automotive fuel consumption. The following illustrate the approximate fuel economy of the monocylindrical hybrid use in a car with the progressive hydrostatic transmission under city driving conditions.

| Method of the fuel economy | Rate fuel economy |
|---|---|
| 1. All modes operation with the minimum specific fuel consumption | 18% |
| 2. Direct energy transmission with the air intercooling supercharger | 12% |
| 3. Engine shut down at every red traffic light | 8% |
| 4. Engine and progressive hydrostatic transmission lighter weight | 7% |
| 5. Energy recuperation with smaller engine capacity | 30% |
| Total | 75% |

The monocylindrical hybrid with the direct energy transmission, variable engine, compressor and pump displacement volume and hydrostatic transmission energy recuperation enables us to achieve approximately 80 miles per gallon in city conditions and to maintain the automotive acceleration magnitude.

The monocylindrical hybrid enables at least:

- using a two-cycle engine with either diesel fuel or two-cycle gasoline engine. In case diesel is used, a conventional system of the injection pump and the fuel injector into cylinder head (not illustrated) are used. In case gasoline is used, a conventional fuel injection system with spark plug into cylinder head (not illustrated) is used. In either case a conventional throttle (not illustrated) is used to control the amount of air entering the intake line of compressor
- using conventional fuel, cooling, electric and other accessory systems, engine starts are provided by muscle efforts independent of external energy sources
- using the additional engine cooling by the receiver water jacket separately or jointly with the engine cooling system, or engine cooling by air
- using the pressurized air in the receiver for other purposes, for example, pumping more air into the tires
- using with various kinds of hydrostatic transmission such as variable or fixed displacement conventional motor, closed or open loop; and providing the cylinders of machinery work equipment with high pressurized fluid using the installation in machinery with either orientation of the engine cylinders axis: vertical or horizontal, or the either angle using various kinds of the swash plate turn automatic system with the engine torque and rotor angle speed signal and with either kind of the feedback: electric, hydraulic or mechanically using with various kinds of gaseous fuels such as propane, natural gas, methane, hydrogen, etc. by means of simple swash plate shift mechanism using the swash plate shift mechanism with automatic or button control for the engine compression ratio alteration and either kind of fuel utilization using the fuel spontaneous combustion (detonation) for more power output per engine displacement volume thanks to the direct energy transmission from engine piston to the pump plunger using the pump's rotor with lobes driving a compressor's valves both the variable displacement hybrid and invariable displacement hybrid.

using the rotor centring shaft for example for driving the fuel injection pump in case of diesel.

Thanks to the foregoing advantages the monocylindrical hybrid may be used in trucks, locomotives, boats, motorcycles, aircraft, portable power systems, construction machinery, automobiles and other kind of the automotive and equipment.

What is claimed as being new and desired to be protected by LETERS PATENT of the United States is as follows:

1. A monocylindrical hybrid two-cycle engine, compressor and pump, said engine comprises cylinder and camshaft, said pump comprises a plunger, valve plate and rotor having of a pistons and synchronize mechanism axial rods, yoke and pivotable swash plate, having turn system and shift system, a conic reducer, and a hydraulic control system comprising pneumohydraulic accumulator, hydrostatic converter, hydraulic distributors, check valves, regenerative braking valve and said valve plate comprises circular slot and autonomous slots associated with said pistons and formed stabilizer hydraulic motor connected in series with said pump and at least one hydrostatic transmission motor.

2. The monocylindrical hybrid of claim 1 wherein said engine cylinder is said pump housing fastened to said valve plate and said pump inlet connected in parallel with said hydrostatic converter outlet and said stabilizer hydraulic motor outlet.

3. The monocylindrical hybrid of claim 1 wherein said synchronize mechanism axial rods mechanically coupled with said pump plunger, said compressor piston, said moveable swash plate and said yoke associated with said rotor by means of a floating support and a boosters.

4. The monocylindrical hybrid of claim 3 wherein said booster comprises two different diameter pistons connected within said rotor's drain chamber and said one piston hydraulicly associated with said pneumohydraulic accumulator by means of said circular slot and said smaller piston mechanically associated with said floating support within said pump chamber.

5. The monocylindrical hybrid of claim 1 wherein said swash plate shift system is comprises a servo cylinder fastened to said valve plate and piston pivotably coupled by means of rod with lever pivotably mounted to said engine cylinder and coupled with said swash plate by means of hinge pin.

6. The monocylindrical hybrid of claim 1 wherein said swash plate turn system is comprises a servo cylinder fastened to said valve plate and piston pivotably coupled with said swash plate pin by means of rod and said swash plate is a differential lever with said pin and hinge pin formed independent and moveable fulcrums.

7. The monocylindrical hybrid of claim 1 wherein said engine compression ratio determines the distance between said rotor centerline and said hinge pin axis independent of said swash plate incline angle in accordance with formula $$\Lambda=(2B+L)/(2B-L)$$

where $\Lambda$ is the engine compression ratio
L is the distance between axial rods axis
B is the distance between said rotor centerline and said swash plate hinge pin axis.

8. The monocylindrical hybrid of claim 1 wherein said conic reducer first gearwheel fastened to said pump's rotor, second conic gearwheel mounted on one shaft with a sprocket wheel associated by means of chain with a second sprocket wheel fastened to said engine camshaft which on opposite side of engine comprises a pulley with a belt.

9. The monocylindrical hybrid of claim 1 wherein said hydrostatic converter having two different diameter pistons mechanically coupled within a drain chamber, said one piston located in inlet chamber coupled with said pneumohydraulic accumulator and said greater diameter piston located in outlet chamber hydraulicly coupled in parallel with said stabilizer hydraulic motor outlet and with a check valve inlet.

10. The hybrid of claim 1 wherein said first hydraulic distributor with solenoids is a five-way distributor having a first line connected with said hydrostatic converter outlet, a second line coupled with said pump outlet and with said check valve inlet, a third line coupled with said pneumohydraulic accumulator, a fourth line coupled with said pump inlet and second check valve inlet and a fifth line coupled with a tank.

11. The hybrid of 1 wherein said first hydraulic distributor having three position: engine starting position, which connected said first, second and fifth lines and said third line coupled with said fourth line; engine idling position, which connected said first, second and fourth lines and said third and said fifth lines is closed; engine work position, which connected said first line with said fourth line, said second line coupled with third line and said fifth line is closed.

12. The hybrid of claim 1 wherein said second hydraulic distributor with solenoids having a first line connected with said check valve outlet and said hydrostatiic motor inlet, a second line coupled with said hydrostatiic motor outlet and regenerative braking valve, a third line coupled with tank and a fourth line coupled with said pneumohydraulic accumulator.

13. The hybrid of claim 12 wherein said second hydraulic distributor with solenoids having three position: automotive start and emergency ahead movement position, which connected said first with said fourth lines and said second with said third lines; second position, which closed all lines; automotive regenerative braking and emergency reverse position, which connected said first line with said third line and said second line with fourth line.

14. The hybrid of claim 1 wherein said regenerative braking valve piston one end located within chamber coupled simultaneously with said hydrostatic motor outlet, said second check valve outlet and said stabilizer motor inlet and second end of the piston located within control chamber associated with automotive brake system by control line.

15. A method of monocylindrical hybrid operation comprising the steps of:

(a) providing uniform fluid flow independent of said single pump plunger supply pulsation by means of high pressure fluid from pump and pneumohydraulic accumulator entered said hydrostatic motor in turn during the engine work cycle and said hydrostatic motor outlet fluid flow goes via said stabilizer hydraulic motor, and (b) providing said engine piston return stroke by means of said hydrostatic converter transformed said pneumohydraulic accumulator fluid pressure magnitude and activated said pump plunger upwards movement, and (c) providing said engine start by means of said pneumohydraulic accumulator energy activated simultaneously said pump plunger upwards movement and stabilizer hydraulic motor motion, and (d)

(e) providing automotive regenerative braking by means of said hydrostatic motor operated in the pump mode and charged said pneumohydraulic accumulator independent of said engine mode operation, and (f) providing said pneumohydraulic accumulator charging by means of said pump outlet interaction with said pneumohydraulic accumulator and said pump inlet interaction with said hydrostatic converter outlet, and (g) providing a signal for said hydrostatic motor displacement volume automatic control by means of maintaining permanent fluid pressure of said stabilizer hydraulic motor inlet independent of said engine load and cycle per min., and (h) providing said synchronize mechanism operation without clearance independent of said swash plate shift and incline angle alteration by means of pneumohydraulic accumulator fluid pressure pushes up booster's pistons, floating support with ledges, yoke and axial rods against the swash plate with force greater than the pump fluid pressure counteraction.

* * * * *